(12) United States Patent
Kimura et al.

(10) Patent No.: US 7,902,798 B2
(45) Date of Patent: Mar. 8, 2011

(54) ELECTRIC POWER GENERATION CONTROL APPARATUS FOR VEHICLE ALTERNATOR

(75) Inventors: Norihito Kimura, Hikinan (JP); Naoki Yamamoto, Chita-gun (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 421 days.

(21) Appl. No.: 12/073,255

(22) Filed: Mar. 3, 2008

(65) Prior Publication Data
US 2008/0224671 A1    Sep. 18, 2008

(30) Foreign Application Priority Data
Mar. 12, 2007    (JP) .................................. 2007-062156

(51) Int. Cl.
*H02P 11/00*    (2006.01)
*H02P 9/00*    (2006.01)

(52) U.S. Cl. ............................ 322/24; 322/44; 322/89

(58) Field of Classification Search .................... 322/17, 322/44, 89, 24, 28, 59; 290/4 C, 46; 307/10.1
See application file for complete search history.

(56) References Cited

U.S. PATENT DOCUMENTS

| | | | |
|---|---|---|---|
| 4,636,706 A | 1/1987 | Bowman et al. | |
| 5,109,815 A | 5/1992 | Maeda et al. | |
| 6,456,048 B2 | 9/2002 | Taniguchi et al. | |
| 6,900,618 B2 | 5/2005 | Maehara | |
| 7,294,991 B2 * | 11/2007 | Kimura et al. | 322/37 |
| 7,423,351 B2 * | 9/2008 | Maehara | 290/40 C |
| 2003/0178973 A1 * | 9/2003 | Maehara | 322/27 |
| 2004/0038775 A1 * | 2/2004 | Shimizu et al. | 477/6 |
| 2006/0192533 A1 * | 8/2006 | Kimura et al. | 322/22 |
| 2007/0085511 A1 * | 4/2007 | Uematsu et al. | 322/28 |
| 2007/0227499 A1 * | 10/2007 | Asada et al. | 123/339.18 |
| 2008/0186000 A1 * | 8/2008 | Kimura et al. | 322/23 |

FOREIGN PATENT DOCUMENTS

| | | |
|---|---|---|
| JP | U-61-171500 | 10/1986 |
| JP | A 62-64299 | 3/1987 |
| JP | A-3-222834 | 10/1991 |
| JP | 05191933 A * | 7/1993 |
| JP | A-5-191933 | 7/1993 |
| JP | A 2003-284257 | 10/2003 |
| JP | B2 3509007 | 1/2004 |

OTHER PUBLICATIONS

English-language Translation of Japanese Office Action.

* cited by examiner

*Primary Examiner* — Julio Gonzalez
(74) *Attorney, Agent, or Firm* — Oliff & Berridge, PLC

(57) ABSTRACT

An electric power generation control apparatus for a vehicle alternator mounted on a motor vehicle performs one of a constant output voltage control a constant torque control and a constant exciting current control in order to suppress a hunting phenomenon of the vehicle alternator. First of all, the electric power generation control apparatus performs the constant output voltage control when a rotation speed is within an idling rotation speed range or a periodic change of the rotation speed is not less than a predetermined value. After completion of the constant output voltage control, when judging that the idle hunting phenomenon is not adequately suppressed, the electric power generation control apparatus performs one of the constant torque control and the constant exciting current control.

10 Claims, 16 Drawing Sheets

ELECTRIC POWER GENERATION CONTROL APPARATUS FOR VEHICLE ALTERNATOR

CROSS-REFERENCE TO RELATED APPLICATION

This application is related to and claims priority from Japanese Patent Application No. 2007-62156 filed on Mar. 12, 2007, the contents of which are hereby incorporated by reference.

BACKGROUND OF THE INVENTION

1. Field of the Invention

The present invention relates to an electric power generation control apparatus for a vehicle alternator, capable of controlling an output voltage of the vehicle alternator by adjusting an exciting current of the vehicle alternator, in particular, relates to an electric power generation control apparatus capable of preventing hunting of a rotation speed of the vehicle alternator.

2. Description of the Related Art

An idling rotation speed of an internal combustion engine mounted on a motor vehicle is more decreased in order to meet a recent requirement of low fuel efficiency. On the other hand, a vehicle alternator more and more generates and outputs a high electric power in order to meet a recent demand. As a result, the electric power generation of the vehicle alternator greatly affects the rotation speed of the vehicle alternator during engine idle.

For example, Japanese patent laid open publication No. JP S62-064299 (corresponding family U.S. Pat. No. 4,636,706) has disclosed a technique capable of suppressing a rapid increase of an electric power torque of a vehicle alternator by gradually increasing an exciting current of the vehicle alternator in order to prevent decreasing the rotation speed of an internal combustion engine in the motor vehicle caused by such a rapid increase of the electric power torque of the vehicle alternator when an electrical load is entered or connected during engine idle.

Japanese patent laid open publication No. JP 2003-284257 (corresponding family U.S. Pat. No. 6,900,618) has disclosed a technique capable of setting a limit value of an exciting current of a vehicle alternator and of controlling an exciting current flowing in an exciting coil of the vehicle alternator so that the exciting current does not exceeds the limit value in order to prevent the occurrence of unstable rotation speed of an internal combustion engine caused by increasing an electric power torque of the vehicle alternator in fluctuation of the electrical loads and rotation speed of the internal combustion engine.

Further, Japanese patent No. 3,509,007, one of inventors thereof is the same inventor according to the present application) has disclosed a technique capable of increasing/decreasing an adjustment voltage according to increasing/decreasing the rotation speed of an internal combustion engine in order to suppress a hunting phenomenon during engine idle where rotation speed of the engine is continuously vibrated by fluctuation of an electric power generation torque.

However, it is impossible to adequately suppress the hunting phenomenon described above during engine idle only by relaxing the fchange of the exciting current disclosed in Japanese patent laid open publication No. JP S62-064299.

Further, although the technique disclosed by Japanese patent laid open publication No. JP 2003-284257 suppresses the hunting phenomenon, a voltage fluctuation occurs in a storage battery by discharging the electric power of the storage battery by decreasing the electric power generation amount of the vehicle alternator. As a result, such a voltage variation of the storage battery causes a problem of flicker of a head lamp of a motor vehicle.

Still further, the technique disclosed by Japanese patent No. 3,509,007 capable of controlling the adjustment voltage causes changing the rotation speed of the vehicle alternator by an impertinent adjustment timing. Thus, this technique involves a difficulty of adjustment such timing.

SUMMARY OF THE INVENTION

It is an object of the present invention to provide an electric power generation control apparatus capable of efficiently eliminating influence of fluctuation of an engine rotation speed during a low rotation speed range such as engine idle.

To achieve the above purposes, the present invention provides an electric power generation control apparatus for a vehicle alternator of a motor vehicle has an exciting current control unit, an exciting current detection unit, a rotation speed detection unit, an output voltage detection unit, and a hunting suppression control unit. The exciting current control unit is configured to control an exciting current which flows in an exciting coil of the vehicle alternator. The vehicle alternator is driven by an internal combustion engine, generates an electric power, and supplies the electric power to a storage battery (such as a secondary battery) of the motor vehicle. The exciting current detection unit is configured to detect the exciting current. The rotation speed detection unit is configured to detect a rotation speed of the internal combustion engine or the vehicle alternator. The output voltage detection unit is configured to detect an output voltage of the vehicle alternator. The hunting suppression control unit is configured to judge one of whether or not the rotation speed is within an idling rotation speed range and whether or not a periodic change of the rotation speed is not less than a predetermined value, and configured to perform an output voltage decreasing control for decreasing the output voltage of the vehicle alternator by a predetermined voltage value in order to suppress a hunting phenomenon of the vehicle alternator when the judgment result indicates that the rotation speed is within the idling rotation speed range or the periodic change of the rotation speed is not less than the predetermined value.

The electric power generation control apparatus according to the present invention controls the output electric power of the vehicle alternator based on detected signals. The electric power generation control apparatus substantially detects the exciting current, the rotation speed, and the output voltage of the vehicle alternator, and performs a PWM (a pulse width modulation) control in order to control the electric power generation of the vehicle alternator based on the detection signals (will also be referred to as the "vehicle alternator information").

The electric power generation control apparatus according to the present invention is equipped with a circuit capable of executing the hunting suppression control to suppress the hunting phenomenon only when the rotation speed is within the idling rotation speed range or when the periodic change of the rotation speed is not less than the predetermined value.

It can be easily judged whether or not the rotation speed is within the idling rotation speed range by comparing the detected rotation speed with the idling rotation speed range which is stored in advance in a memory.

Further, it can be easily judged whether the periodic change of the rotation speed is not less than the predetermined value by detecting the periodic fluctuation amplitude of the rotation speed or a periodic fluctuation amplitude of each of the exciting current and the output voltage corresponding to the periodic fluctuation change of the rotation speed, and by comparing the detected one with a threshold value which is stored in the memory in advance.

The electric power generation control apparatus according to the present invention performs the output voltage decreasing control for decreasing the output voltage of the vehicle alternator by the predetermined voltage value. The output voltage decreasing control can efficiently suppress the hunting phenomenon of the vehicle alternator because the polarization in the storage battery which affects the fluctuation of the rotation speed can be decreased. Because the voltage and polarization amount of the storage battery correlate to each other, the amount of the polarization in the storage battery is decreased when the voltage of the storage battery approaches the opening voltage of the storage battery. This means that the periodic fluctuation of the polarization fluctuation energy acts the hunting vibration in the vehicle alternator when a high voltage of the storage battery is periodically changed while the voltage of the storage battery is changed according to the fluctuation of the rotation speed and the output voltage caused by the idling hunting. If the voltage of the storage battery is maintained to a voltage near the opening voltage thereof having a small polarization amount, it is possible to decrease the vibration energy of the idling hunting and thereby to easily suppress the idling hunting phenomenon.

Still further, in the electric power generation control apparatus according to the present invention, because the output voltage decreasing control is performed only when the rotation speed is within the idling rotation speed range or the periodic change of the rotation speed is not less than the predetermined value, it is possible to suppress the drawback caused by decreasing the output voltage of the storage battery.

In the electric power generation control apparatus as another aspect of the present invention, when the judgment result indicates that the rotation speed is within the idling rotation speed range or the periodic change of the rotation speed is not less than the predetermined value, the hunting suppression control unit performs the output decreasing control so that the output voltage of the vehicle alternator is equal to the target adjustment voltage which is larger than the opening voltage of the storage battery and lower than the reference output voltage which is determined in advance corresponding to the storage battery temperature. This control can suppress the hunting phenomenon during engine idle while suppressing the battery discharging.

In the electric power generation control apparatus as another aspect of the present invention, when the judgment result indicates that the rotation speed is within the idling rotation speed range or the periodic change of the rotation speed is not less than the predetermined value, the hunting suppression control unit performs the output decreasing control so that the output voltage of the vehicle alternator is equal to an target adjustment voltage which is approximately equal to an opening voltage of the storage battery. This control can suppress the idling hunting phenomenon while suppressing the battery discharging.

It is preferable that the target adjustment voltage, which is approximately equal to an opening voltage of the storage battery, is set to a value obtained by adding the battery opening voltage to the wiring voltage-drop value between the storage battery and the vehicle alternator. It is thereby possible to prevent or suppress the discharge of the storage battery even if the output voltage of the storage battery is decreased for the idling hunting suppression. The battery opening voltage is accurately considered to be a function of the battery charging state and the wiring voltage-drop value is to be a function of a wiring current. It is possible to set those values as the predetermined values of a high frequency for convenience. In addition, it is possible to calculate those values in order to calculate the target adjustment voltage which is approximately equal to the opening voltage of the storage battery.

The electric power generation control apparatus as another aspect of the present invention perform the constant torque control for keeping a constant torque of the vehicle alternator. This constant torque control can efficiently suppress the hunting phenomenon. Further, because the hunting suppression control unit performs the constant torque control when the judgment result indicates that the rotation speed is within the idling rotation speed range or the periodic change of the rotation speed is not less than the predetermined value, it is also possible to suppress the drawback to increase the output voltage fluctuation caused by carrying out the constant torque control.

The electric power generation control apparatus as another aspect of the present invention performs the constant exciting current control for keeping a constant exciting current. This constant exciting current control can efficiently suppress the hunting phenomenon. Further because the hunting suppression control unit performs the constant exciting current control only when the judgment result indicates that the rotation speed is within the idling rotation speed range or the periodic change of the rotation speed is not less than the predetermined value, it is also possible to suppress the drawback to increase the output voltage fluctuation caused by carrying out the constant exciting current control.

In the electric power generation control apparatus as another aspect of the present invention, the hunting suppression control unit performs one of the above control operations, the output voltage suppression control, the constant torque control, and the constant exciting current control when the judgment result indicates that the rotation speed is within the idling rotation speed range and the periodic change of the rotation speed is not less than the predetermined value. Because the hunting suppression unit performs the hunting suppression control only when the execution of the hunting suppression is strongly desired, it is possible to efficiently eliminate the drawback caused by the hunting suppression control.

In the electric power generation control apparatus as another aspect of the present invention, the hunting suppression control unit firstly performs the output voltage decreasing control for decreasing the output voltage of the vehicle alternator by a predetermined voltage value, and when the hunting suppression control cannot suppress the hunting phenomenon of the vehicle alternator, the hunting suppression control unit performs one of the constant torque control and the constant exciting current control for keeping a constant exciting current constant. It is thereby possible to enhances the hunting suppression capability while suppressing the output voltage fluctuation caused by the constant torque control or the constant exciting current control, as low as possible.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
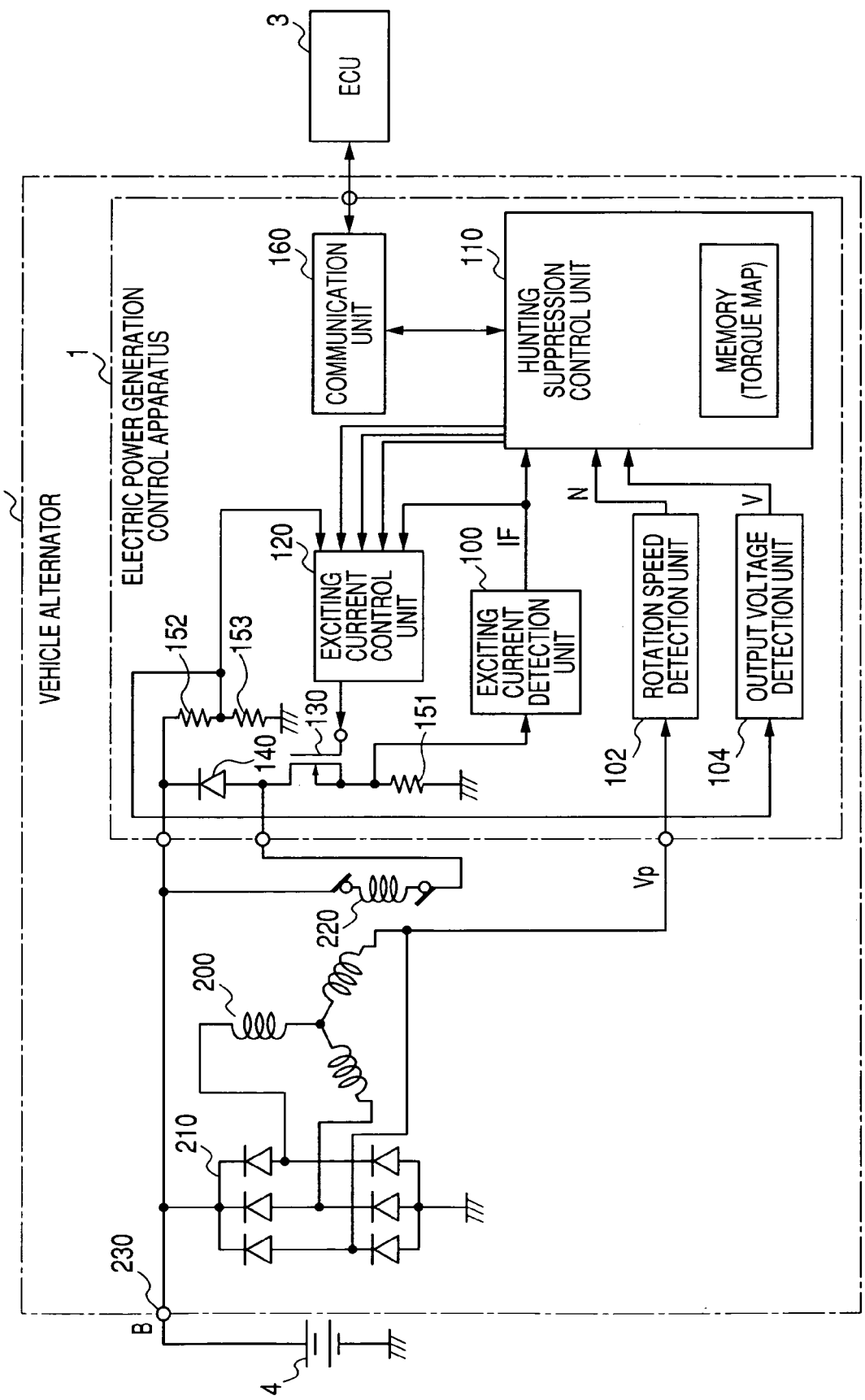
FIG. 1 is a block diagram showing a circuit configuration of an electric power generation control apparatus for a vehicle alternator of a motor vehicle according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of an electric power generation control apparatus 1 for a vehicle alternator in a motor vehicle according to an embodiment of the present invention. FIG. 1 is a block diagram showing a circuit configuration of the electric power generation control apparatus 1 for a vehicle alternator according to the embodiment of the present invention.

The electric power generation control apparatus 1 is mounted on a vehicle alternator 2. The electric power generation control apparatus 1 controls that a voltage of an output terminal (B terminal) 230 of the vehicle alternator 2 has a predetermined adjustment voltage, for example, 14.0 V.

The electric power generation control apparatus 1 incorporates a built-in hunting suppression control unit 110 capable of controlling that a calculated torque of the vehicle alternator 2 is equal to a target electric power generation torque. The electric power generation control apparatus 1 is also capable of communicating with an engine control unit (ECU) 3.

The functions and operation of the electric power generation control apparatus 1 according to the embodiment will be explained later in detail.

The vehicle alternator 2 is comprised of a stator coil 200, a rectifier 210, an exciting coil 220, and equipped with the electric power generation control apparatus 1. The rectifier 210 performs a full wave rectification of an AC voltage induced in the stator coil 200, and outputs the rectified voltage to external electrical loads (not shown), and a storage battery 4 (or a secondary battery). The exciting coil 220 generates a field magnetic flux using the exciting current supplied through the output terminal (B terminal) 230.

Since the configuration and operation of other components other than the electric power generation control apparatus 1 in the vehicle alternator 2 are well known, the explanation of those components is omitted here.

(Circuit Configuration of the Electric Power Generation Control Apparatus 1)

The electric power generation control apparatus 1 is comprised of an exciting current detection unit 100, a rotation speed detection unit 102, an output voltage detection unit 104, a hunting suppression control unit 110, an exciting current control unit 120, a power transistor 130, a free wheel diode 140, resistance elements 151, 152, and 153, and a communication unit 160.

The free wheel diode 140 is connected to the exciting coil 220 in anti-parallel connection. The power transistor 130 and the resistance element 151 for use in current detection are connected to the exciting coil 220 in series. That is, the power transistor 130 is arranged at a low side configuration.

The exciting current detection unit 100 detects a current (as an exciting current) which flows in the power transistor 130 under a voltage drop of the resistance element 151, namely, under a voltage drop of a source terminal of the power transistor 130 connected through the resistance element 151 for current detection.

The rotation speed detection unit 102 performs the rotation speed detection of the vehicle alternator 2 based on a frequency of each phase voltage in the stator coil 200. Because the output voltage Vp of one phase in the stator coil 200 has a waveform with a duty ratio of 50% in proportion to the rotation speed of the vehicle alternator 2, it is possible to obtain the rotation speed of the vehicle alternator by counting the number of pulses per time after the output voltage Vp is binalized.

A voltage dividing circuit comprised of the resistance elements 152 and 153 divides the voltage of the output terminal 230 (B terminal), namely, divides the output voltage of the vehicle alternator 2. Because the divided voltage is supplied to the output voltage detection unit 104, the output voltage detection unit 104 detects the output voltage of the vehicle alternator 2 based on this received divided voltage.

The exciting current control unit 120 performs a feedback control so that an output voltage of the vehicle alternator 2 is equal to a predetermined adjustment voltage supplied from the hunting suppression control unit 110 and a current of the vehicle alternator is equal to a predetermined exciting current supplied from the hunting suppression control unit 110. Such a feedback control executed by the exciting current control unit 120 is substantially a PWM (pulse width modulation) control as On and Off control using an exciting current driving transistor 130 with a necessary duty ratio.

Because a circuit configuration and a basic electric power generation control of components other than the hunting suppression control unit 110 in the vehicle alternator 2 is well known, the explanation of those components is omitted here.

(Circuit Configuration of the Exciting Current Control Unit 120)

Figure 2:
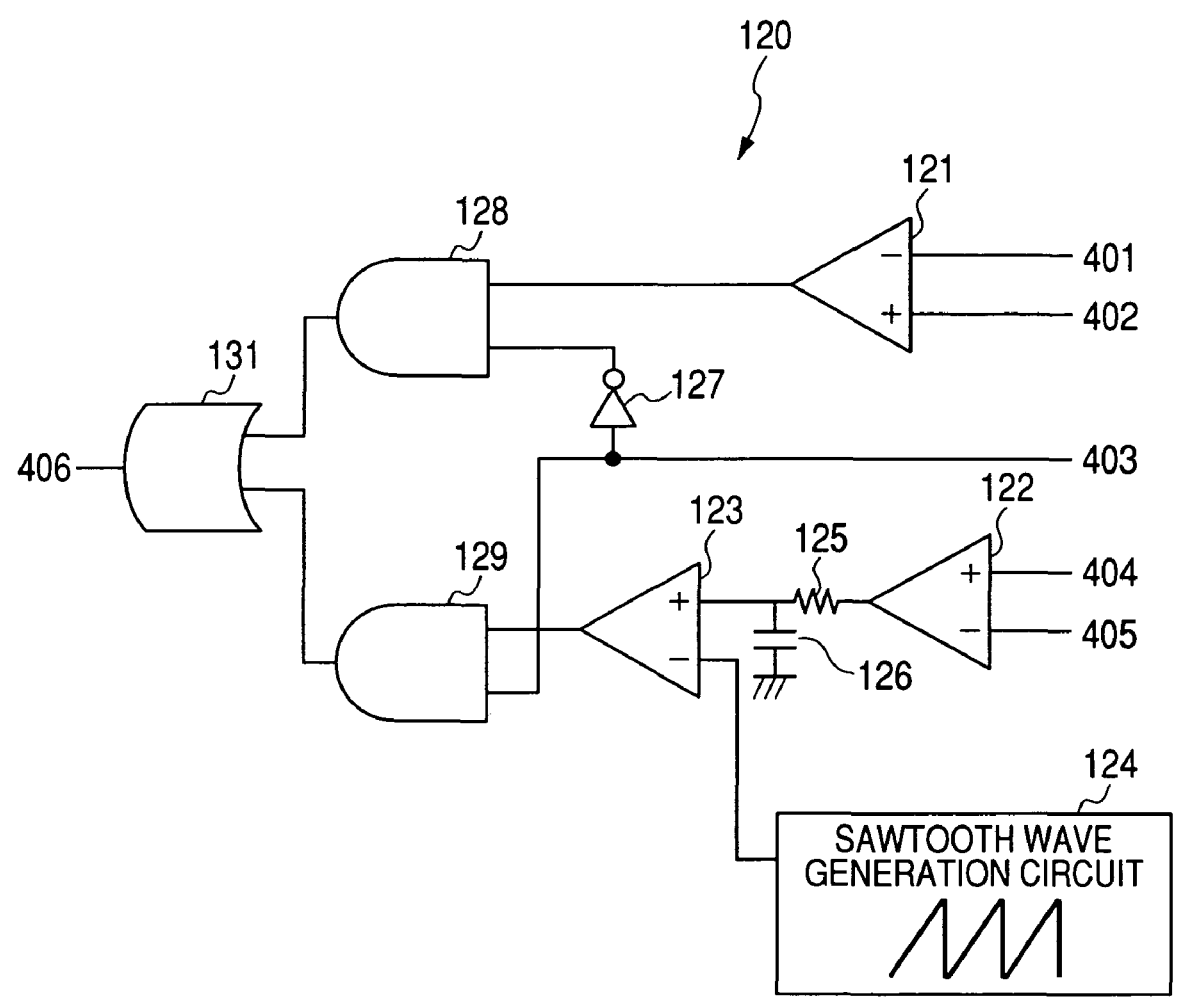
FIG. 2 is a diagram showing a configuration of an exciting current control circuit in the electric power generation control apparatus shown in FIG. 1.

A description will now be given of the circuit configuration of the exciting current control unit 120 in the electric power generation control apparatus 1 with reference to FIG. 2. FIG. 2 is a diagram showing a configuration of the exciting current control unit 120 in the electric power generation control apparatus 1 shown in FIG. 1.

The exciting current control unit 120 is comprised of voltage comparators 121, 122, and 123, a saw-tooth wave generation circuit 124, a resistance element 125, a capacitance 126, a NOT circuit 207, AND circuits 128 and 129, and an OR circuit 131.

The voltage comparator 121 compares an adjustment voltage 402 (corresponding to the divided voltage obtained by the resistance elements 152 and 153) supplied from the hunting suppression control unit 110 through an positive input terminal (IN+) of the voltage comparator 121 with a divided voltage 401 of the output voltage supplied from the vehicle alternator 2 through an negative input terminal (IN-) of the voltage comparator 121. The voltage comparator 121 then outputs a high level output signal to the AND circuit 128 when the adjustment voltage 402 supplied from the hunting suppression control unit 110 is larger than the divided voltage 401.

The NOT circuit 127 reverses a hunting suppression control flag signal 403 transferred from the hunting suppression control unit 110, and the reversed signal is transferred to the AND circuit 128. The AND circuit 128 outputs an output signal to the power transistor 130 through the OR circuit 131.

The voltage comparator 122 compares an exciting current instruction value 404 supplied from the hunting suppression control unit 110 through its positive input terminal (IN+) of the voltage comparator 122 with an exciting current value 405 supplied from the exciting current detection unit 100 through its negative input terminal (IN-) of the voltage comparator 122. The voltage comparator 122 then outputs a high level output signal when the exciting current instruction value 404 transferred from the hunting suppression control unit 110 is larger than the exciting current value 405 from the exciting current detection unit 100.

This high level output signal provided from the voltage comparator 122 is smoothed by a smoothing circuit comprised of a resistance element 125 and the capacitance 126. The smoothed high level output signal is then input into the positive (+) input terminal of the voltage comparator 123.

A saw-tooth wave signal output from the saw-tooth wave generation circuit 124 is input to a negative (-) input terminal of the voltage comparator 123. The voltage comparator 123 generates a PWM signal having a duty ratio corresponding to the comparison result, and then transfers the generated one to the AND circuit 129. The hunting suppression control unit 110 transfers a hunting suppression control flag signal to the AND circuit 129. The AND circuit 129 performs a logical AND operation between the PWM signal and the hunting suppression control flag signal, and outputs a logical AND signal as a logical operation result to the power transistor 130 through the OR circuit 131.

The exciting current control unit 120 shown in FIG. 2 switches the output voltage adjustment function performed by the voltage comparator 121 and the exciting current adjustment function performed by both of the voltage comparators 122 and 123 according to a binary level (High or Low level) of the hunting suppression control flag signal.

(Hunting Suppression Control Unit 110)

Next, a description will now be given of the operation of the hunting suppression control unit 110 equipped with a microcomputer in the electric power generation control apparatus 1.

The hunting suppression control unit 110 inputs the three electric power generation data items such as the exciting current value IF, the rotation speed value N, and the output voltage value V described above.

The hunting suppression control unit 110 has a memory storing a torque map which indicates a relationship between those three electric power generation data items and a torque (or an output torque) of the vehicle alternator 2.

The hunting suppression control unit 110 is capable of calculating an electric power generation torque based on the above three electric power generation data items.

FIG. 3 to FIG. 7 show flow charts of a hunting suppression control procedure performed by the hunting suppression control unit 110 in the electric power generation control apparatus 1 of the embodiment shown in FIG. 1. The routines shown in the flow charts in FIG. 3 to FIG. 7 are repeatedly executed every a predetermined time interval.

(Switching the Constant Voltage Control and the Hunting Suppression Control)

A description will now be given of the switching operation between the constant voltage control and the hunting suppression control. In particular, the hunting suppression operation includes a part of the constant voltage control, namely, the present invention considers a part of the constant voltage control as the hunting suppression control, in which an adjustment voltage is decreased from a usual reference adjustment voltage value to a target adjustment voltage which is lower than the usual reference adjustment voltage value by a predetermined value. That is, the hunting suppression control is composed of a constant torque control and a constant exciting current control, which will be explained later in detail. In other words, the constant voltage control for decreasing the adjustment voltage is a weakly-performed hunting suppression control, and the hunting suppression control composed of the constant torque control and the constant exciting current control is a forcedly-performed hunting suppression control In the flow chart shown in FIG. 3, the hunting suppression control unit 110 judges whether or not the idling hunting suppression control instruction value is a high level when receiving it transferred from the engine control unit (ECU) 3 through the communication unit 160 (step S100).

When the idling hunting suppression control instruction value is a high level, the hunting suppression control unit 110 performs the idling hunting suppression control (step S102). When the idling hunting suppression control instruction value is a low level, the hunting suppression control unit 110 performs the usual constant voltage control (step S104).

Figure 3:
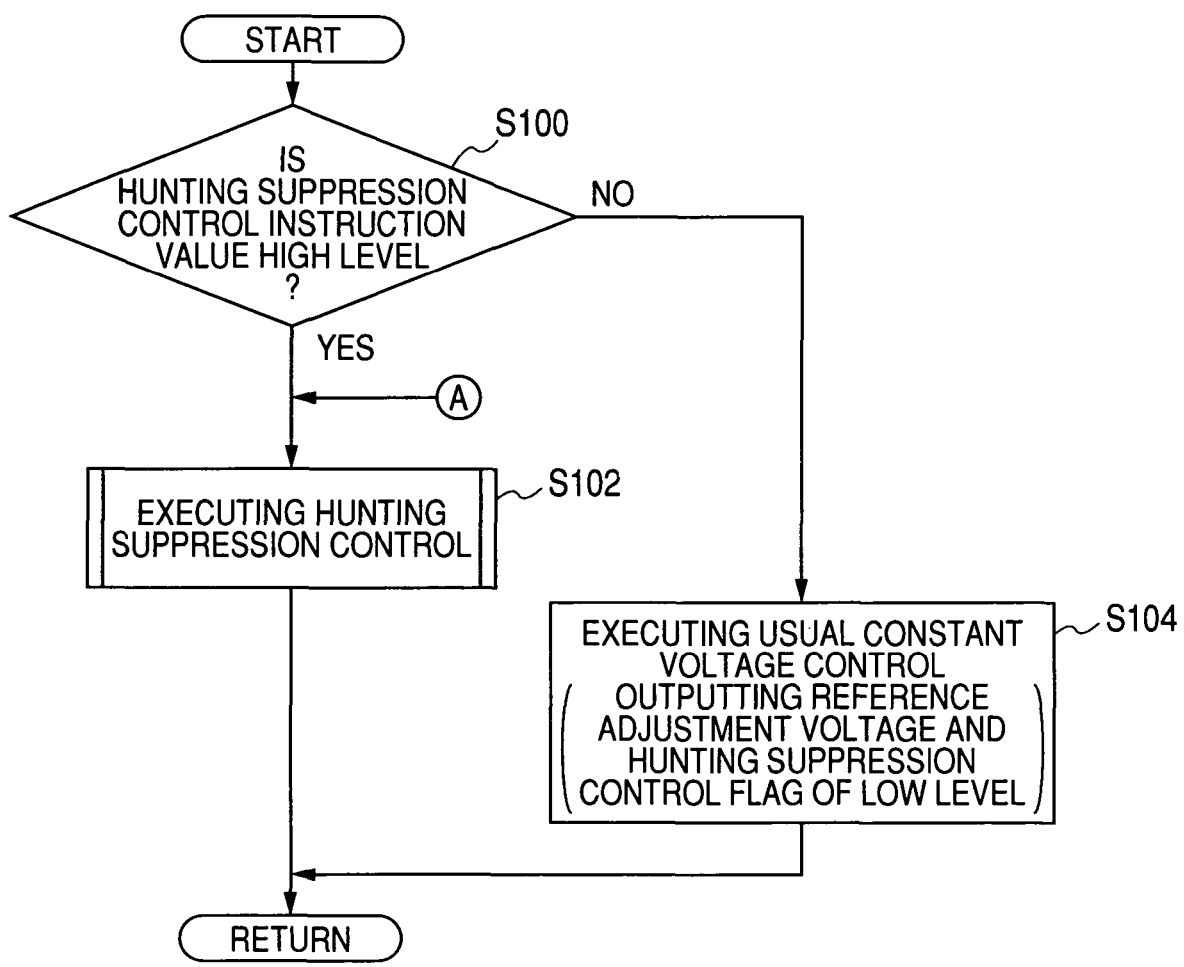
FIG. 3 to FIG. 7 show flow charts of a hunting suppression control procedure performed by the hunting suppression control unit in the electric power generation control apparatus according to the embodiment shown in FIG. 1.

In the flow chart shown in FIG. 3, the constant voltage control (step S104) performs a usual exciting current PWM feedback control so that the output voltage of the vehicle alternator 2 converges on the reference adjustment voltage value which is determined in advance based on a temperature of the storage battery (or a secondary battery) mounted on a motor vehicle. The engine control unit (ECU) 3 outputs the hunting suppression control flag of a low level to the exciting current control unit 120.

(Idling Hunting Suppression Control)

A description will now be given of the detailed explanation of the idling hunting suppression control in step S102 and steps S200 to S210 with reference to FIG. 4.

The hunting suppression control unit 110 reads the exciting current value IF, the rotation speed N, and the output voltage V (step S200), and judges whether or not a predetermined length of time is elapsed ("No" in step S202). When the predetermined length of time is not elapsed, the hunting suppression control unit 110 continues the operation of the usual constant voltage control (step S204).

On the contrary, when the predetermined length of time is elapsed ("Yes" in step S202), the hunting suppression control unit 110 decreases the adjustment voltage by a predetermined value (Vreg=Vreg−α, step S206). For example, the predetermined period of time and the predetermined value are determined based on a battery voltage changing speed when a head lamp flickers.

Following, the hunting suppression control unit 110 judges whether or not the output voltage reaches the target adjustment voltage which is set in advance (step S208). The hunting suppression control unit 110 continuously performs the constant voltage control ("Yes" in step S208 and step S204) until the adjustment voltage reaches the target adjustment voltage.

When the adjustment voltage reaches the target adjustment voltage ("Yes" in step S208), the operation flow goes to step S209. In step S209, the hunting suppression control unit 110 judges whether or not the hunting phenomenon is suppressed.

The judgment for the hunting suppression is performed based on whether the periodic changing amplitude of the exciting current is lower than a predetermined threshold value. The present invention is not limited by this judgment. For example, it is possible to judge the hunting suppression based on whether the periodic changing amplitude of the rotation speed or of the output voltage is lower than a predetermined threshold value.

In step S209, the hunting suppression control unit 110 judges what the hunting suppression is performed ("Yes" in step S209), the operation flow goes to step S204. On the contrary, the hunting suppression control unit 110 judges that the hunting suppression is not adequately performed ("No" in step S209), the hunting suppression control unit 110 performs a judgment routine whether or not the constant torque control is performed (step S210), which will be explained later with reference to FIG. 5.

(Setting the Target Adjustment Voltage)

A description will now be given of the target adjustment voltage which is used in step S208 in FIG. 4.

The target adjustment voltage is used during the constant voltage control as the weakly-performed hunting suppression control. The target adjustment voltage is set to the value which is lower than the reference adjustment voltage value by a predetermined value.

The reason why the target adjustment voltage is set to the value which is lower than the reference adjustment voltage value by the predetermined value is to decrease the influence of a polarization of the storage battery. Such a reason will now be explained in detail.

The polarization in the storage battery is a phenomenon of a voltage change generated by changing a concentration distribution of electrolytic solution in the storage battery. The polarization is observed so that an internal resistance of the storage battery is seemingly increased.

Figure 8:
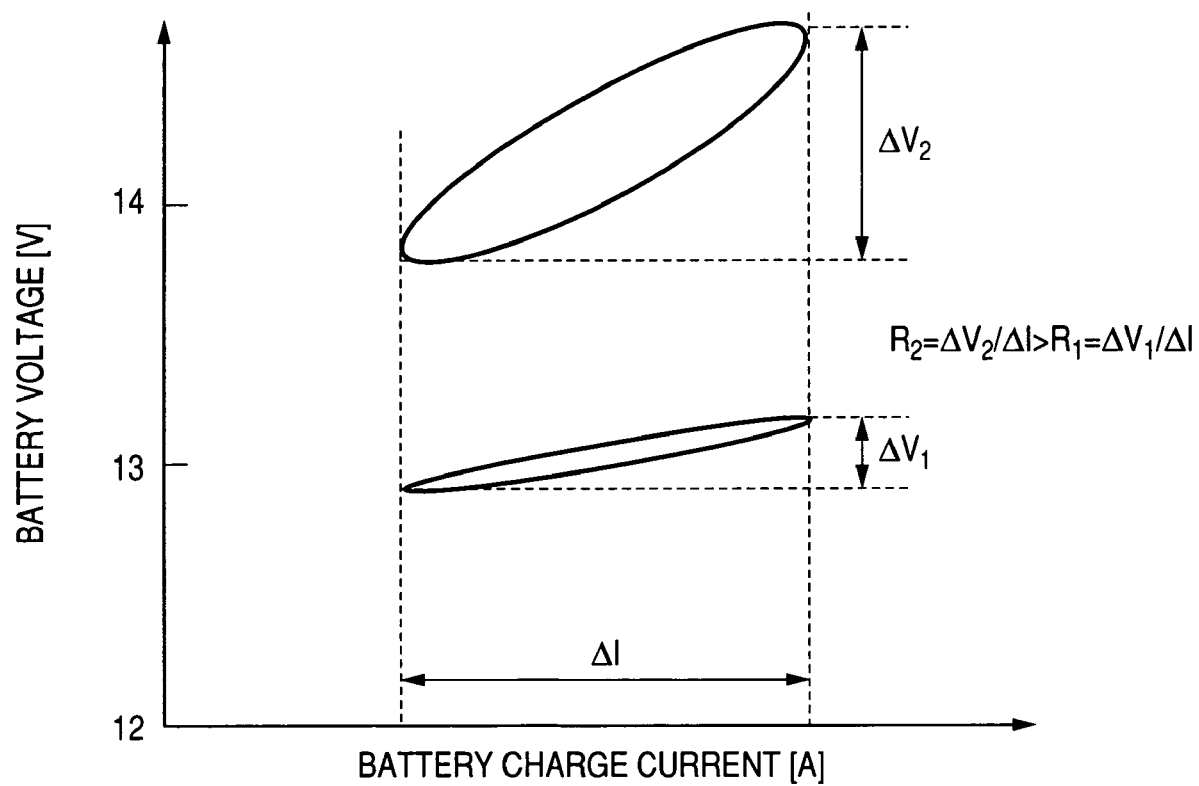
FIG. 8 is a diagram showing a relationship between a battery current change and a battery voltage change in a storage battery.

FIG. 8 is a diagram showing a relationship between a battery current change and a battery voltage change in the storage battery (or a secondary battery). As understood from FIG. 8, the more the terminal voltage of the storage battery increases, the more the influence of the polarization increases, that is, the more the seeming internal resistance of the storage battery increases. When the constant torque control or the constant exciting current control is carried out for the hunting suppression, the output current of the vehicle alternator 2 varies unless the engine rotation speed becomes zero (0 rpm). As a result, the battery current change occurs and the output voltage of the storage battery varies.

The battery voltage change value ΔV can be expressed by the following equation.

$$\Delta V = \text{Battery current change value } \Delta I \times \text{Battery internal resistance } R.$$

In the embodiment of the present invention, the influence of the polarization in the storage battery is decreased by setting the target adjustment voltage to the value which is lower than the reference adjustment voltage value, and the electric power generation is performed in a range of a small internal resistance of the storage battery. This can suppress the battery voltage change or fluctuation caused by the polarization in the storage battery.

However, because a capacitance of the storage battery is decreased by decreasing the target adjustment voltage, there is a possibility of a problem, for example, the vehicle engine cannot start. It is therefore preferable to set the target adjustment voltage to a value or more obtained by adding an opening voltage within a voltage range, in which the storage battery is not discharged, and a voltage drop at wirings between the storage battery and the vehicle alternator. Still further, it is preferable to set the target adjustment voltage to a value near the reference adjustment voltage within a range of the battery voltage changing level where a headlamp and the like flickers.

(Judgment of the Constant Torque Control)

Next, a description will now be given of the judgment routine for judging the execution of the constant torque control in step S210 shown in FIG. 4 and FIG. 5.

In step S300, the electric power generation torque of the vehicle alternator 2 is calculated using a well-known method. In step S302, the target torque value (as an initial value) is calculated based on the electric power generation torque of the vehicle alternator 2. The target torque (initial value) is set as an average torque in a hunting period, for example, because the output current value corresponding to the average torque in the hunting period corresponds to a necessary load current. It is possible to set, as the initial target torque value, the electric generation torque when the engine rotation speed reaches a target idling rotation speed which is set by the engine control unit (ECU) 3.

Next, it is judged whether the electric power generation torque is within a following range (step S304):

(Target torque−predetermined value $dt$)<Electric power generation torque<(Target torque+predetermined value $dt$).

When the above relationship is not satisfied, the usual constant voltage control is performed (step S306). When the above relationship is satisfied, the exciting current instruction value is calculated in order to perform the constant torque control (step S308). The exciting current instruction value and the hunting suppression control value of a high level are output to the exciting current control unit 120 in order to initiate the constant torque control (step S310).

The reason why the constant torque controls initiated after the electric power generation torque is within the range "(Target torque−predetermined value dt)<Electric power generation torque<(Target torque+predetermined value dt)", is to avoid a rapid fluctuation of the engine rotation speed at the initiation of the constant torque control. The calculation of the exciting current instruction value is carried out as a feedback exciting current control process for eliminating a difference between the calculated electric power generation torque and the target torque value.

Figure 5:
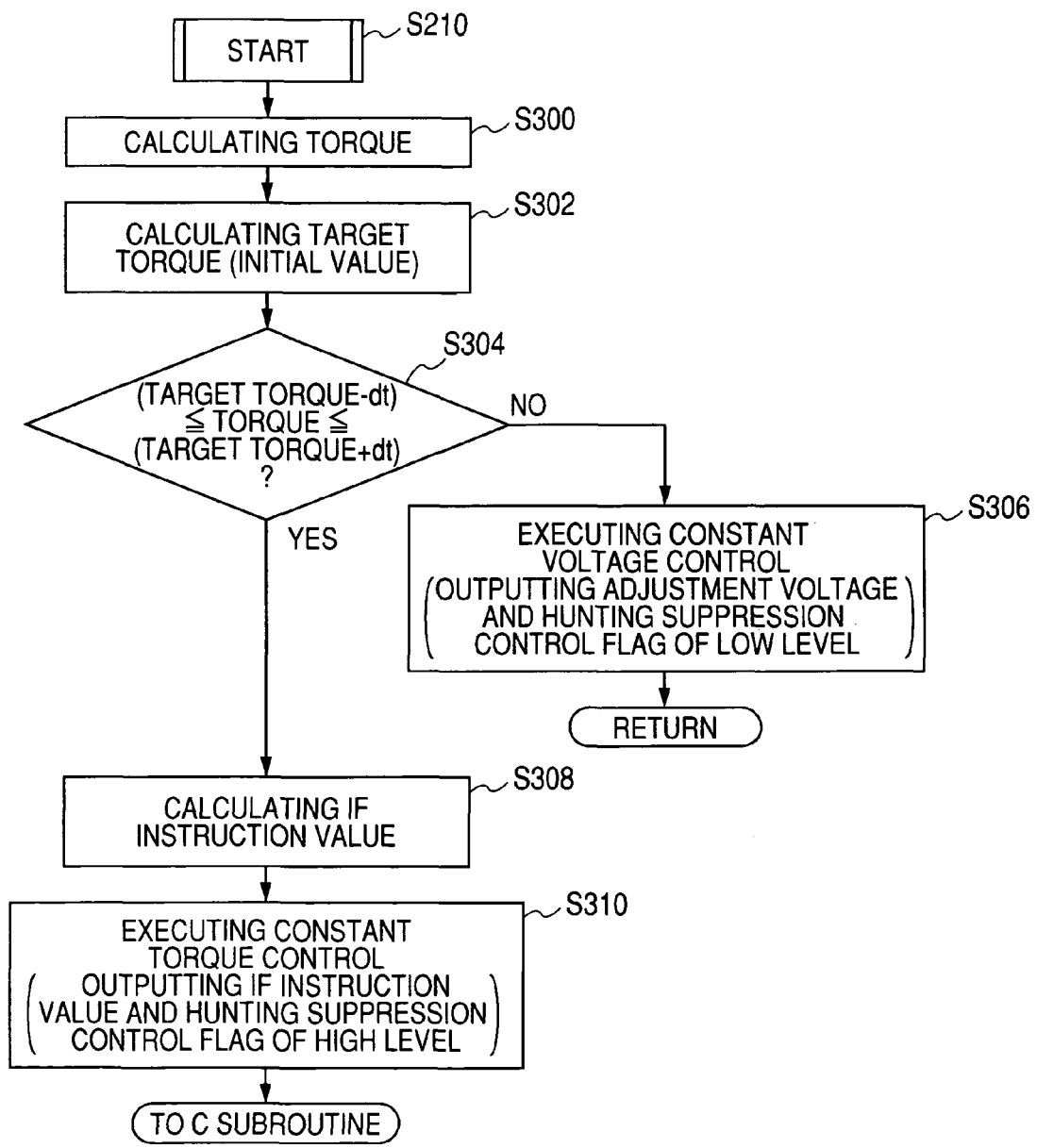
Figure 6:
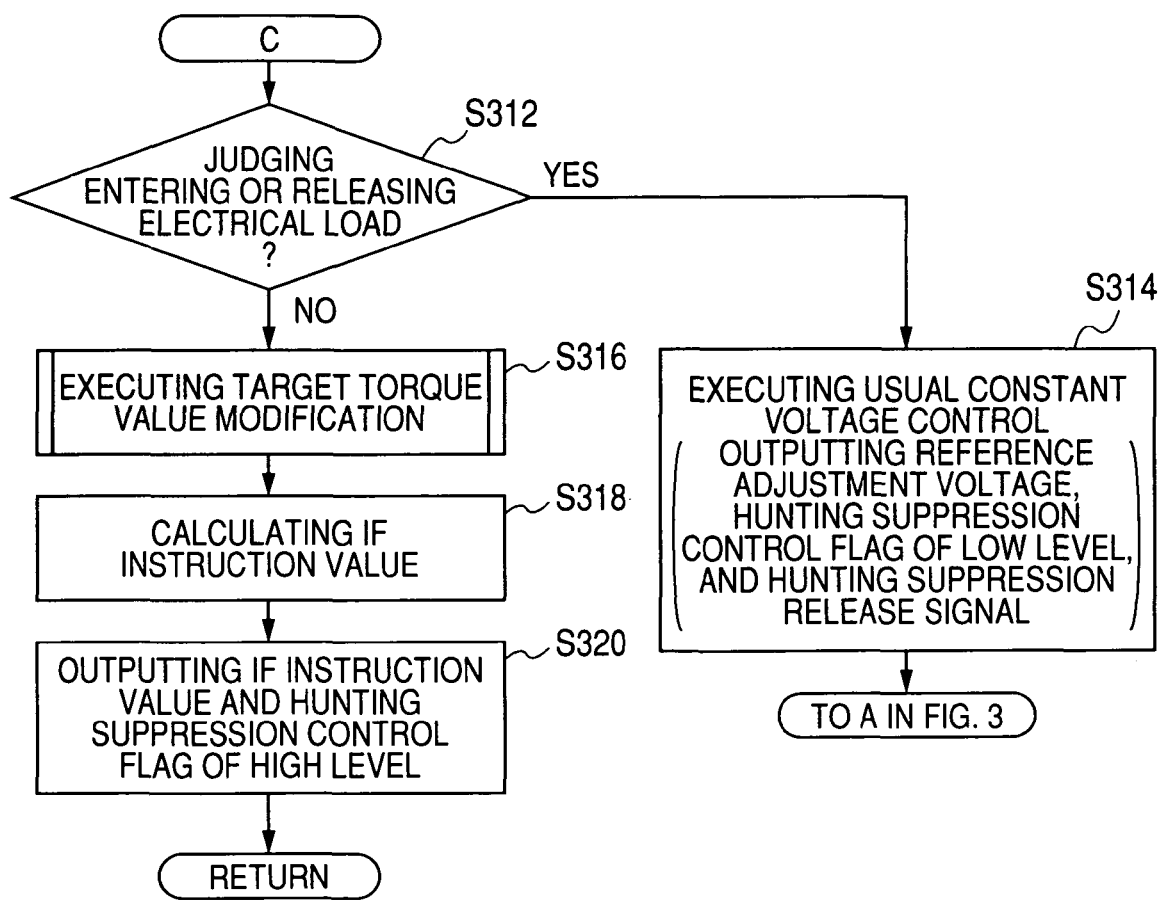

Next, after the initiation of the constant torque control shown in FIG. 5, the control operation in the flowchart shown in FIG. 6 is performed.

First, it is judged whether or not the electrical load of a predetermined magnitude or more is generated or eliminated (step S312).

The reason why is as follows. Because the idling hunting phenomenon occurs under a constant load condition, and a torque operation point of the vehicle alternator is shifted and the idling hunting phenomenon is suppressed when an additional electrical load enters and the total electrical load is thereby changed or when the electrical load is interrupted. It is preferable that the current operation is switched to the constant voltage control process when an additional electrical load is entered or the current electrical load is interrupted.

When it is judged that the electrical load is entered or interrupt, the hunting suppression control unit 110 outputs the reference adjustment voltage value and the hunting suppression control flag of a low level to the exciting current control unit 120, and further outputs the hunting suppression release signal to the engine control unit (ECU) 3 through the communication unit 160 (step S314).

For example, it is possible to judge whether the electrical load is entered or interrupted based on the magnitude of an output voltage change speed. That is, it is judged that the electrical load is entered or interrupted when the output voltage change speed is a threshold value. It is also possible to judge it based on an absolute value of an output voltage change value.

When it is judged that no electrical load is entered or interrupted, a modification subroutine to modify the target torque value is executed (step S316), and the hunting suppression control unit 110 calculates the exciting current instruction value based on the same manner prescribed above (step S318). The hunting suppression control unit 110 outputs the exciting current instruction value calculated and the hunting suppression control flag of a high level to the exciting current control unit 120 in order to continue the constant torque control (step S320).

(Modifying Target Torque Value)

A description will now be given of the target torque modification control subroutine (step S316) with reference to FIG. 7.

Figure 7:
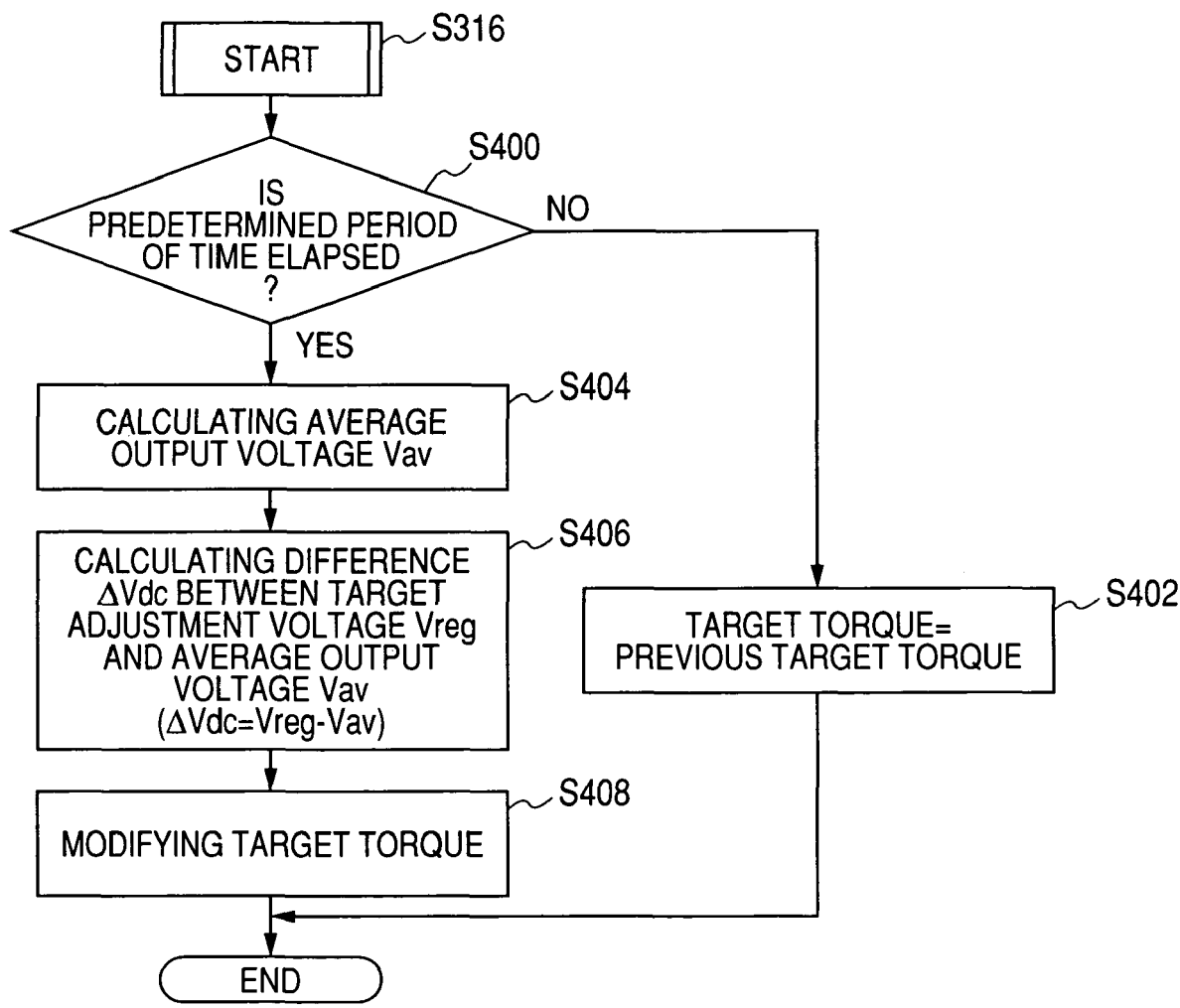

The subroutine step S316 and steps S400 to S408 shown in FIG. 7 modified the target torque value in order to modify an error, namely, a difference between an actual output voltage value and the target adjustment voltage value which is set in advance.

In the battery charge process performed by the usual constant voltage control, the battery charge current value is decreased after the output voltage of the storage battery reaches the target adjustment voltage.

On the contrary, in the constant torque control, the battery charge current value is decreased after the output voltage reaches the target adjustment voltage value.

In the constant torque control, because the battery charge current is not decreased even if the output voltage of the storage battery reaches the target adjustment voltage, the battery terminal voltage is increased by the influence of the polarization and the charging ratio increase, and the output voltage finally exceeds the target adjustment voltage value.

In order to avoid this, the hunting suppression control unit 110 judges whether or not a predetermined period of time is elapsed (step S400), when the judgment result indicates that the predetermined period of time is not elapsed ("No" in step S400), the hunting suppression control unit 110 maintains the target torque value (step S402). On the contrary, when the judgment result indicates that the predetermined period of time is elapsed ("Yes" in step S400), the hunting suppression control unit 110 calculates a difference between the target adjustment voltage value and the calculated average output voltage (step S406), and executes the well-known feedback control of increasing or decreasing the target torque value in order to eliminate the difference (step S408).

The reason why it is checked whether the predetermined period of time is elapsed or not is as follows.

When the change timing of the target torque value is fast, the electric power generation torque does not become constant, and is changed based on the constant voltage control. As a result, the effect of the idling hunting suppression control is decreased. For example, the predetermined period of time is the idling hunting period.

(Engine Control Unit (ECU) 3)

The engine control unit 3 judges the occurrence of the idling hunting state or an apparent occurrence of the idling hunting state. When judging such states, the engine control unit 3 outputs the idling hunting suppression control instruction value of a high level to the communication unit 160. On the contrary, when the engine control unit 3 judges it is not in the idling hunting state, the engine control unit 3 outputs the idling hunting suppression control instruction value of a low level to the communication unit 160.

The idling hunting state is defined as the state having the engine rotation speed of not less than a predetermined value within a rotation speed range in the engine idling state.

The state where an idling rotation speed apparently occurs is defined as the state having the engine rotation speed within the idling rotation speed or near the idling rotation speed.

The engine control unit 3 compares the periodic vibration amplitude of the engine rotation speed read from the memory with the threshold value in order to judge the occurrence of the idling hunting state, like the method of related art technique.

Figure 4:
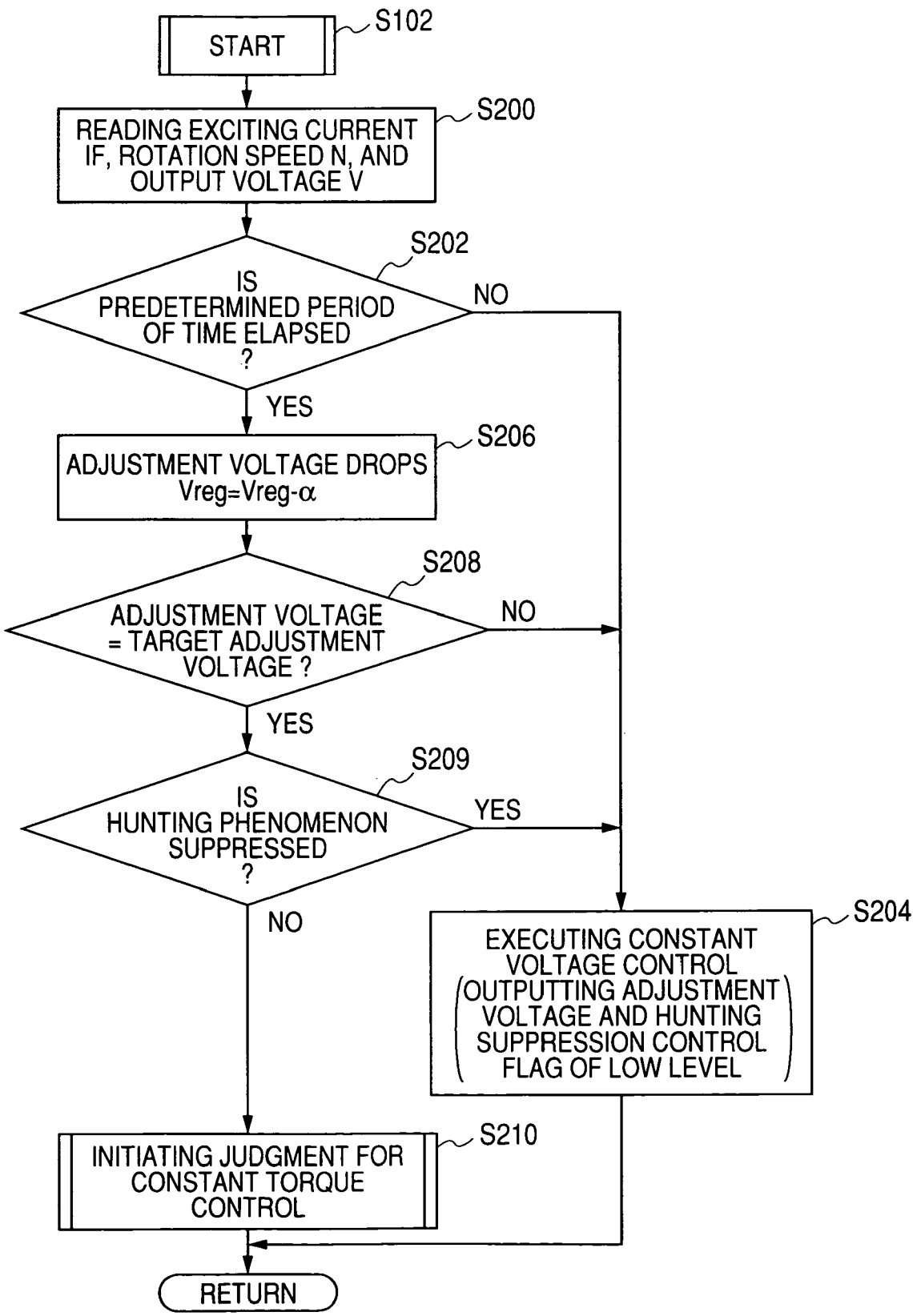

The engine control unit 3 compares the periodic vibration amplitude of the engine rotation speed read from the memory with the threshold value in order to judges the occurrence of the hunting suppression shown in step S209 in FIG. 4. The hunting suppression control unit 110 can perform those judgments instead of the engine control unit 3. In this case, the hunting suppression control unit 110 also judges the occurrence of the idling hunting state and the occurrence of the hunting suppression based on the magnitude of the periodic change amplitude of the engine rotation speed, the exciting current, or the output voltage, just like the related art technique.

When receiving the hunting suppression control release signal transferred from the hunting suppression control unit 110 through the communication unit 160, the engine control unit 3 outputs the idling hunting suppression control instruction value of a low level to the communication unit 160.

The occurrence of the idling hunting sate or the apparent occurrence of the idling hunting state can be judged based on the state when the change value of the engine rotation speed is not less than a threshold value during the engine idling state in which a throttle is fully opened and the vehicle speed is 0 km/h and.

The communication unit 160 transfers the idling hunting suppression control instruction value transferred from the engine control unit (ECU) 3 to the hunting suppression control unit 110. Still further, the communication unit 160 transfers the hunting suppression control release signal transferred from the hunting suppression control unit 110 to the engine control unit 3. The communication unit 160 has a communication protocol for data communication between the engine control unit 3 and the hunting suppression control unit 110. The communication unit 160 further converts data items to various data formats of other devices and units to which the data items are transferred.

(Effects)

Because the electric power generation control apparatus according to the present invention described above can perform the hunting suppression control so that the vehicle alternator 2 has a constant output torque, it is possible to suppress the idling hunting of the engine rotation caused by the torque change of the vehicle alternator 2. Further, because the electric power generation control apparatus according to the present invention can perform the torque control for the vehicle alternator 2 within a narrow range in the internal resistance of the storage battery, it is possible to suppress the voltage fluctuation of the storage battery. It is thereby possible to prevent the flicker of a headlamp and the like.

(First Modification)

In the embodiment described above, the hunting suppression control unit 110 performs the constant torque control for the hunting suppression of the vehicle alternator 2 (step S310 in FIG. 5). On the contrary, the first modification performs a constant exciting current control shown in FIG. 9 to FIG. 14, instead of the constant torque control shown in FIG. 5 to FIG. 7.

Figure 9:
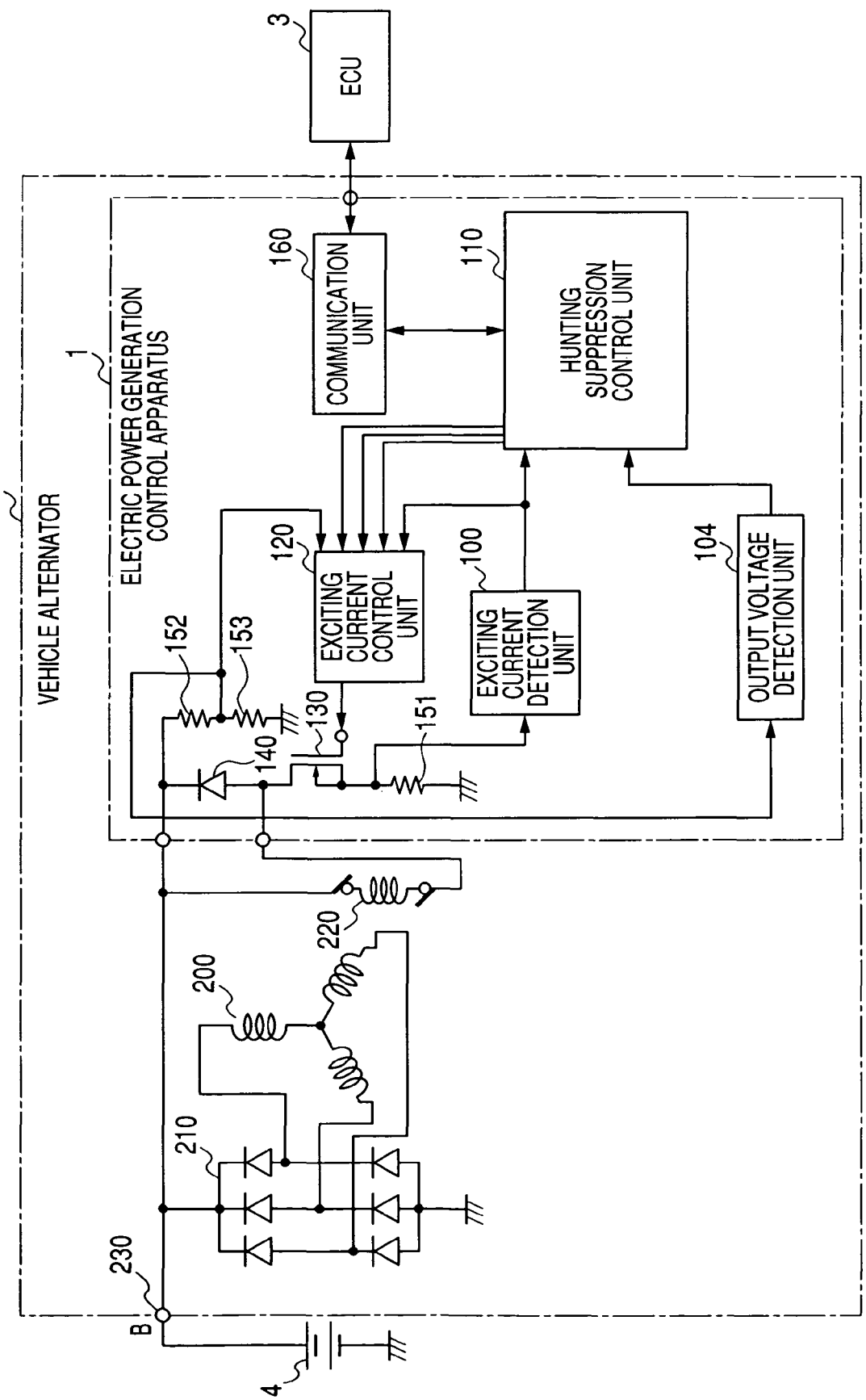
FIG. 9 is a block diagram showing a circuit configuration of the electric power generation control apparatus for a vehicle alternator of a motor vehicle according to a first modification of the embodiment according to the present invention.
Figure 10:
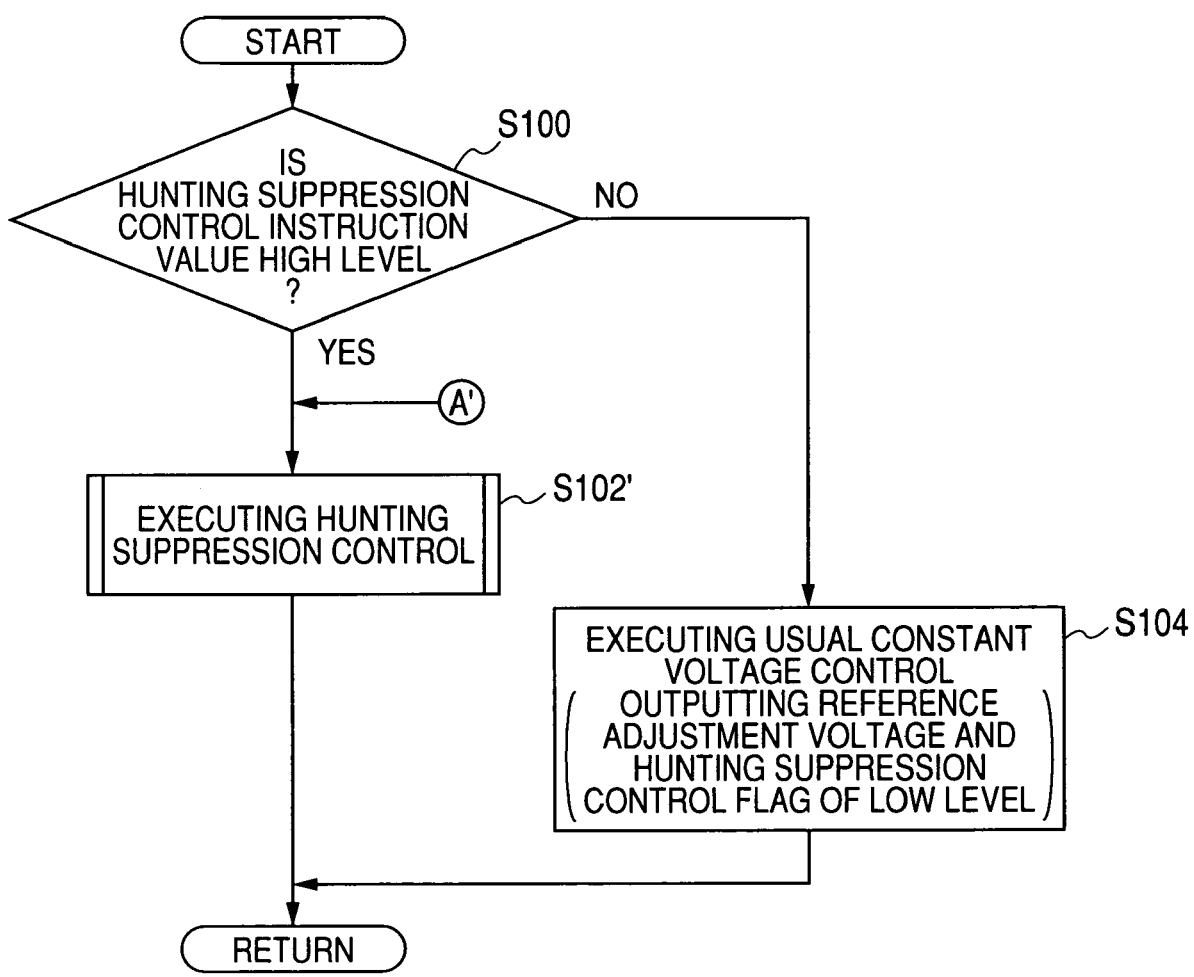
FIG. 10 to FIG. 14 are flow charts showing a hunting suppression control procedure performed by the electric power generation control apparatus according to the first modification shown in FIG. 9.
Figure 11:
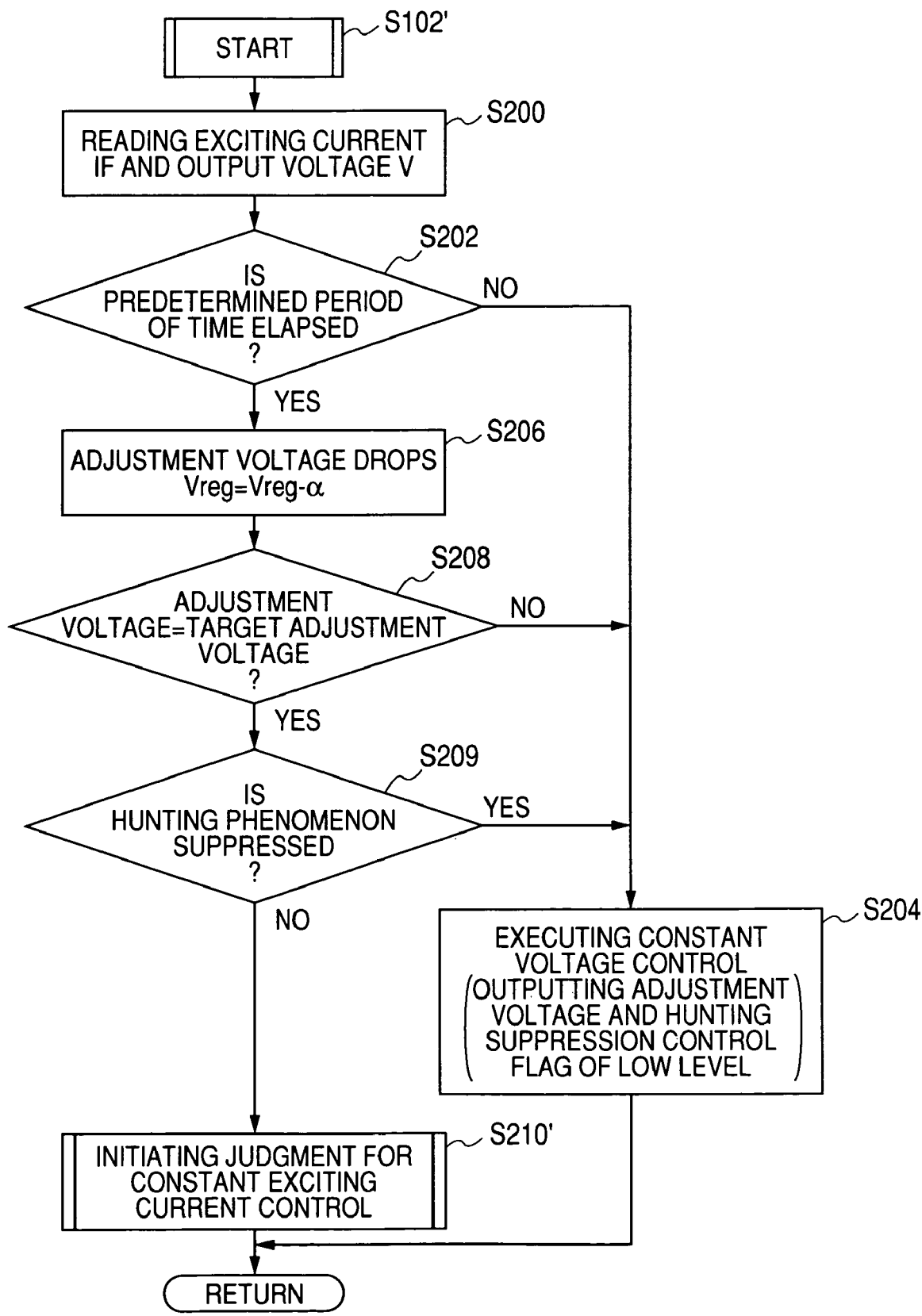

FIG. 9 is a block diagram showing a circuit configuration of the electric power generation control apparatus for a motor vehicle according to a modification of the embodiment according to the present invention. FIG. 10 to FIG. 14 show flow charts showing a hunting suppression control by the electric power generation control apparatus of the modification shown in FIG. 9.

The first modification performs the constant exciting current control (step S210' in FIG. 11) to suppress the torque change of the vehicle alternator 2 in order to suppress the idling hunting. As a result, the first modification can decrease the calculation amount or load of the microcomputer and the memory size because of eliminating the torque calculation function from the hunting suppression control unit 110 and the map regarding the output torque of the vehicle alternator 2.

Figure 12:
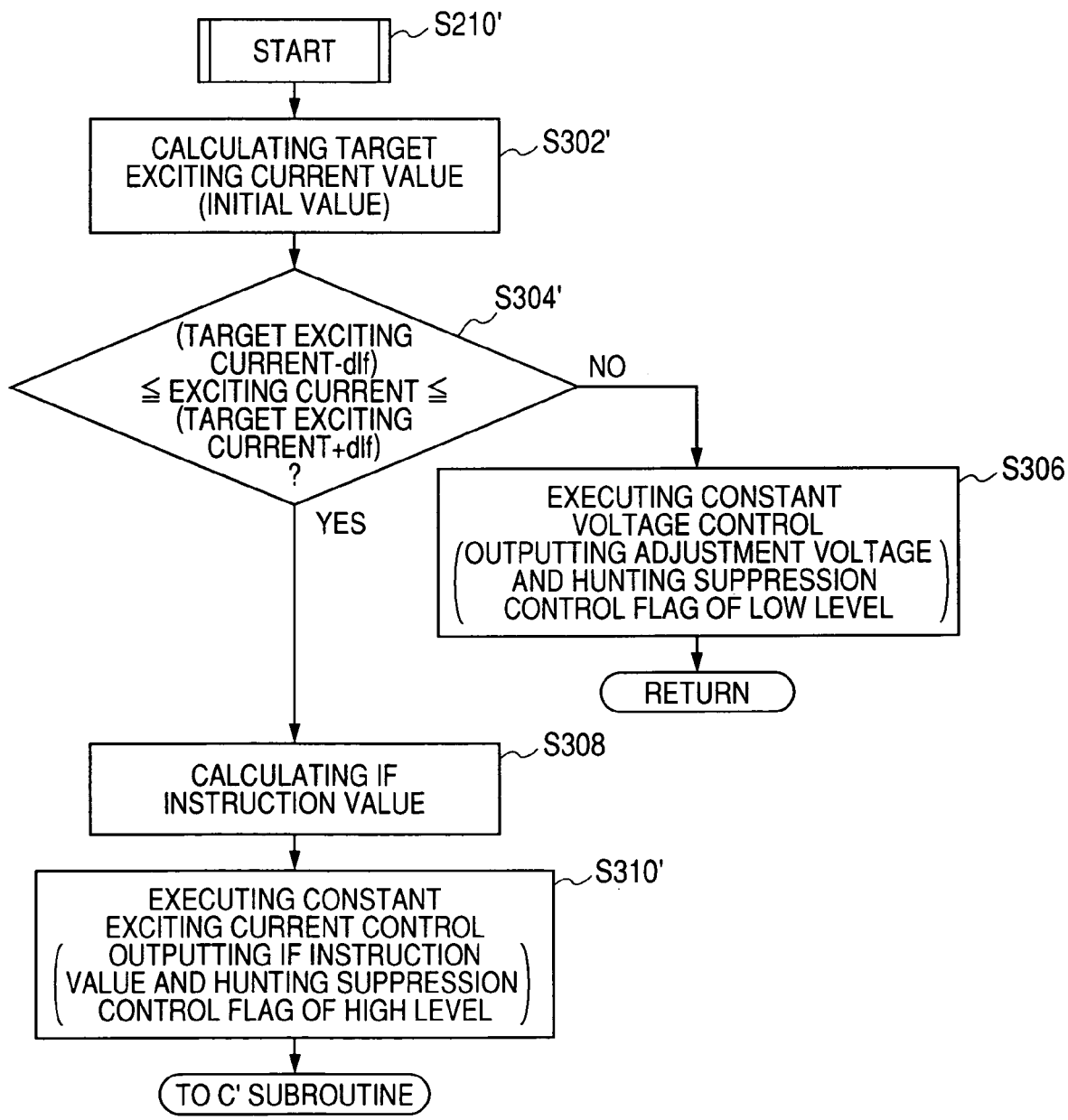

It is possible that an average exciting current value in a hunting period is used as the initial value of the target exciting current shown in FIG. 12 because the output current value corresponding to the average exciting current value in the hunting period almost corresponds to a necessary amount of a load current.

Still further, it is possible to set, as the initial target exciting current, an exciting current value (step S302' in FIG. 12) when the engine rotation speed becomes or reaches the target idling rotation speed set by the engine control unit 3.

When the exciting current value becomes within a range of (Target exciting current value−Predetermined value dIf) to (Target exciting current value+Predetermined value dIf) (step S304' in FIG. 12), the exciting current instruction value is calculated (step S308 in FIG. 12) in order to execute the exciting current constant control (step S310' in FIG. 12).

The reason why the exciting current starts within the above range is to prevent a rapid fluctuation of the engine rotation speed when the constant exciting current control is initiated.

The usual constant voltage control is performed (step S306 in FIG. 12) when the exciting current value is out of the range of (Target exciting current value−Predetermined value dIf) to (Target exciting current value+Predetermined value dIf).

Figure 13:
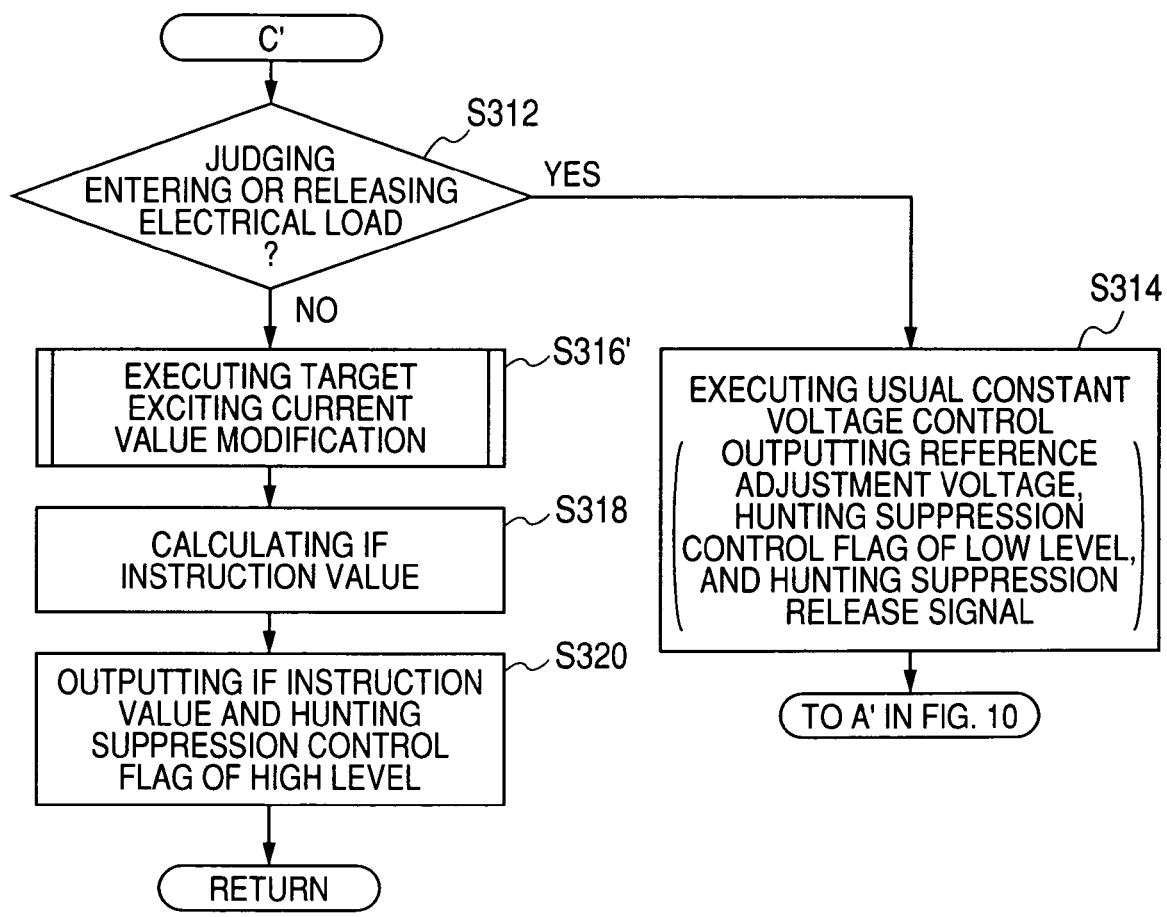
Figure 14:
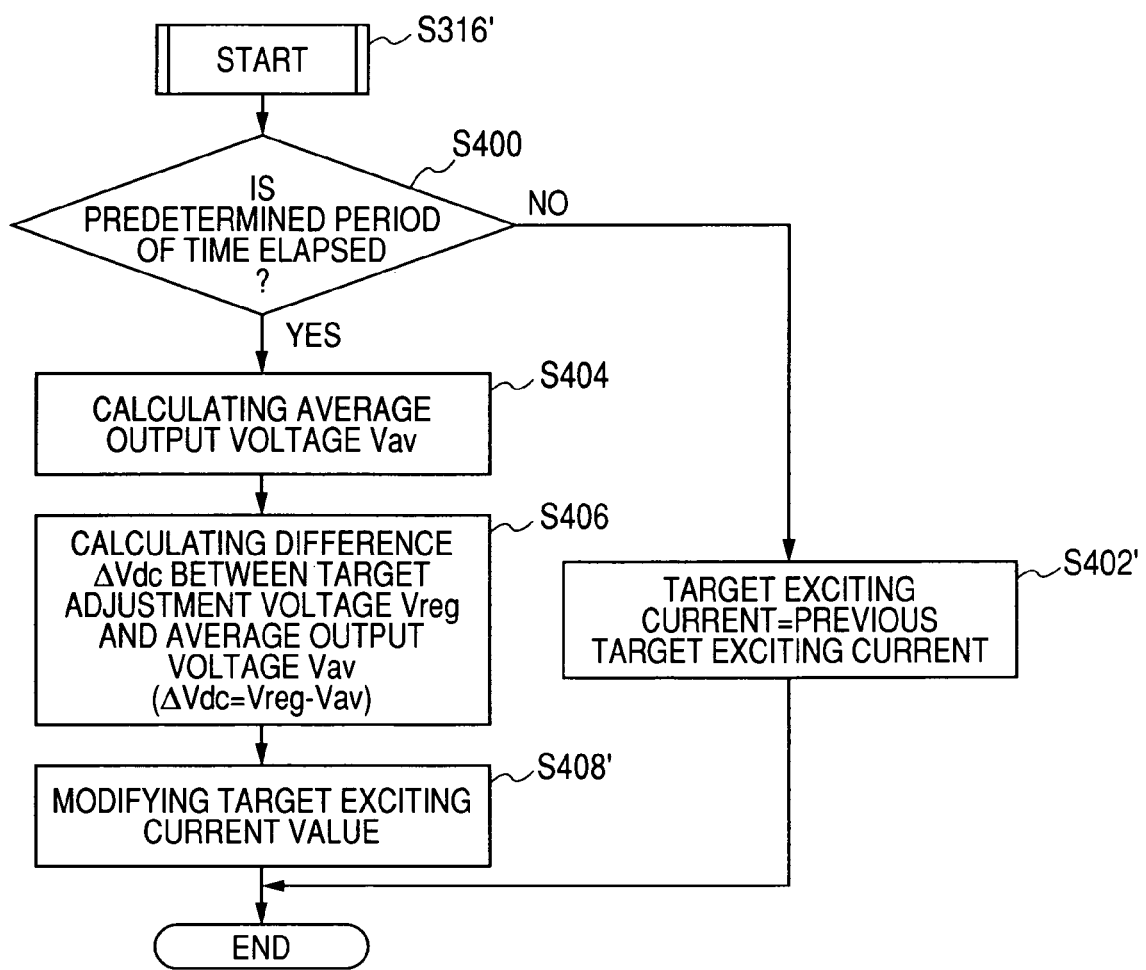

Similar to the target torque value modification shown in FIG. 7, it is possible to modify the target exciting current value by the procedure shown in step 316' in FIG. 13 and steps S400 to S408' in FIG. 14.

The subroutine of the target torque value modification shown in FIG. 14 modifies the target exciting current value in order to modify an error, namely, a difference between an actual exciting current value and the target exciting current value which is set in advance. The difference of the modifying operations shown in FIG. 14 and FIG. 7 is as follows.

When the judgment result indicates the predetermined period of time is elapsed ("Yes" in step S400 in FIG. 14), the hunting suppression control unit 110 calculates a difference between the target adjustment voltage value and the calculated average output voltage (step S406 in FIG. 14), and executes the well-known feedback control of increasing or decreasing the target exciting current value in order to eliminate the difference (step S408'). On the contrary, when the judgment result indicates the predetermined period of time is not elapsed ("No" in step S400 in FIG. 14), the hunting suppression control unit 110 so sets that the target exciting current value becomes the previous target exciting current value (step S402' in FIG. 14).

(Second Modification)

Figure 15:
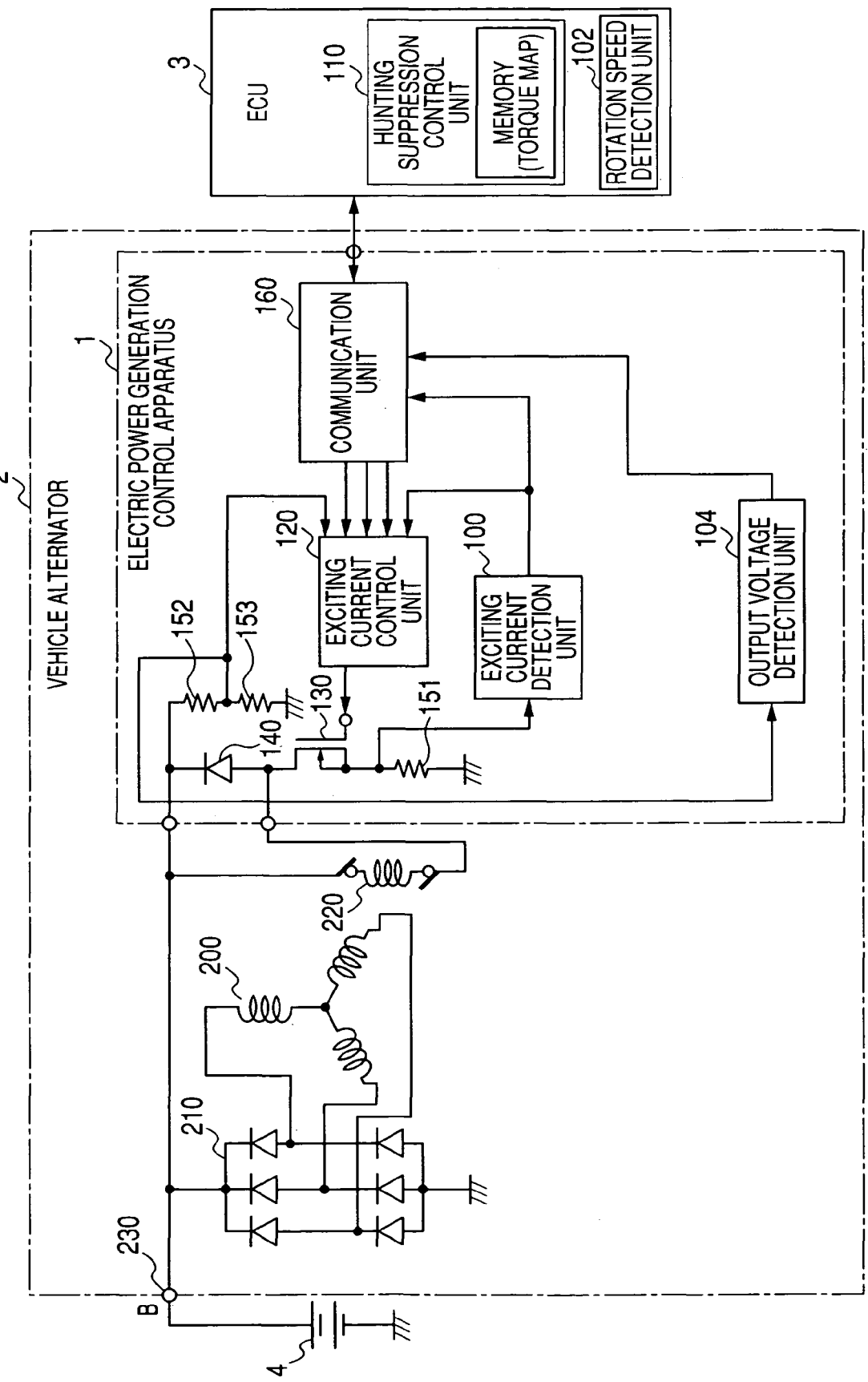
FIG. 15 is a block diagram showing a circuit configuration of the electric power generation control apparatus for vehicle alternator of a motor vehicle according to a second modification of the embodiment according to the present invention.

FIG. 15 is a block diagram showing a circuit configuration of the electric power generation control apparatus for a motor vehicle according to the second modification of the embodiment of the present invention.

Although the electric power generation control apparatus 1 of the embodiment described above has the built-in hunting suppression control unit 110, it is possible that the engine control unit 3 is equipped with the hunting suppression control unit 110, as shown in FIG. 15. Further, the engine control unit 3 is equipped with the rotation speed detection unit of the vehicle alternator 2, as shown in FIG. 15. In this case, it is possible to detect the rotation speed of the vehicle alternator based on a relationship between the engine rotation speed and a pulley ratio between a crank pulley and a pulley of the vehicle alternator 2.

(Third Modification)

Although the engine control unit 3 judges the occurrence of the idling hinting state or the apparent idling hunting state in the embodiment described above, it is possible that the electric power generation control apparatus 1 has such a judging function.

For example, the engine rotation speed of the vehicle alternator 2 is calculated based on a relationship between the rotation speed of the vehicle alternator 2 detected by the rotation speed detection unit 102 and the pulley ratio between the crank pulley and the pulley of the vehicle alternator 2. When the engine rotation speed is not more than a threshold value of the idling rotation speed obtained from the idling rotation speed set by the engine control unit 3 in advance, it is judged that the current state of the vehicle engine is in the idling state.

Still further, the electric power generation control apparatus 1 calculates the engine rotation change amount based on the calculated engine rotation speed, and when the engine rotation change amount is not less than a threshold value, the electric power generation control apparatus 1 judges that the current state is the idling hunting state. As a result, it is possible to eliminate the engine control unit 3 and the communication unit 160 from the electric power generation control apparatus 1, and this can reduce the manufacturing cost of the electric power generation control apparatus 1.

(Fourth Modification)

In the embodiment described above, the hunting suppression control is performed when it is judged that the current state is the idling hunting state or the apparent idling hunting state. However, it is possible to always execute the hunting suppression control during the engine idle state. The occurrence of the engine idle state can be judged when a throttle is fully opened and the vehicle speed is 0 km/h or when the engine rotation speed is not more than a threshold value. As a result, this enables that the engine rotation speed becomes stable during the engine idle state, and the engine rotation speed is further decreased, and the efficiency of the fuel consumption is further increased.

(Fifth Modification)

In the embodiment described above, the target adjustment voltage is set to the predetermined value of not less than the battery opening voltage and of not more than the reference adjustment voltage which has been determined in advance. The present invention is not limited by this condition.

Figure 16:
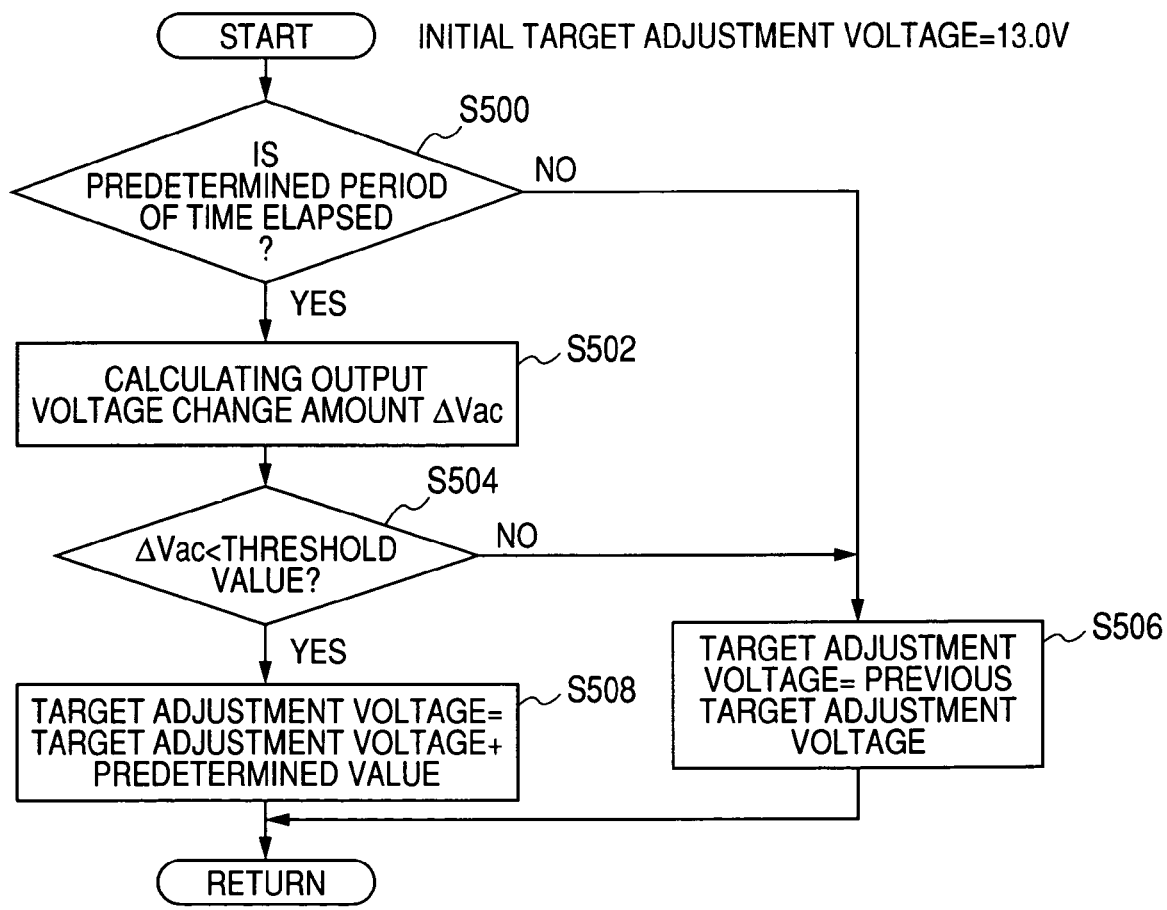
FIG. 16 is a flow chart showing the hunting suppression control of the electric power generation control apparatus according to a fifth modification of the embodiment according to the present invention.

FIG. 16 is a flow chart showing the hunting suppression control of the electric power generation control apparatus according to a fifth modification of the embodiment according to the present invention. For example, as shown in FIG. 16, it is possible to change the target adjustment voltage. The reason is the opening voltage of the storage battery is changed according to the battery charging condition and the polarization state of the storage battery.

In FIG. 16, the initial value of the target adjustment voltage is set to a value (for example, approximately 13.0 V) obtained by adding approximately 12.8V at the battery opening voltage in the full charging condition (100%), which is the voltage of not discharging at the most least influence of the polarization and the maximum wiring voltage drop (for example, 0.2 V) between the storage battery, and the output voltage change amount ΔVac is calculated during a predetermined period of time (step S502). After the predetermined time is elapsed (step S500), it is judged whether or not the calculated output voltage change amount (or a battery voltage change amount) ΔVac is less than a predetermined threshold value corresponding to the voltage change amount where the head lamp and the like flicks (step S504).

When the calculated output voltage change amount ΔVac is less than the threshold voltage, the target adjustment voltage is increased by a predetermined value (for example, 0.1 V) (step S508).

On the contrary, when the calculated output voltage change amount ΔVac is not less than the threshold value, the current target adjustment voltage is kept (step S506).

As shown in FIG. 7 and FIG. 14, the output voltage of the vehicle alternator 2 increases because the target torque or the target exciting current value is increased in order to decrease the difference between the calculated output voltage change amount ΔVac and the target adjustment voltage when the target adjustment voltage is increased.

Thus, it is possible to increase the charging efficiency of the storage battery because the output voltage of the vehicle alternator can be brought toward the reference adjustment voltage to satisfy the voltage change amount not to cause headlamp flicker and to which the storage battery is charged by gradually changing the target adjustment voltage while the output voltage change amount (or the battery voltage change amount) is monitored.

(Sixth Modification)

In the embodiment and various modifications described above, the hunting suppression control procedure is performed during the engine idle state. However, the present invention is not limited by such a control procedure. It is possible to execute the hunting suppression control when the rotation speed is within a range between not less than the idling rotation speed and not more than the predetermined rotation speed (for example, 1200 rpm). As a result, it is possible to obtain the stable rotation speed of the internal combustion engine during a low rotation speed range of not more than a predetermined rotation speed.

(Seventh Modification)

In the embodiment and various modifications described above, although the output voltage of the vehicle alternator is detected, it is possible to detect the voltage of the storage battery (or a secondary battery) instead of the output voltage of the vehicle alternator.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An electric power generation control apparatus for a vehicle alternator, comprising:
    an exciting current control unit configured to control an exciting current, which flows in an exciting coil of a vehicle alternator which is driven by an internal combustion engine, generates an electric power, and supplies the electric power to a storage battery;
    an exciting current detection unit configured to detect the exciting current;
    a rotation speed detection unit configured to detect a rotation speed of the engine or the vehicle alternator;
    an output voltage detection unit configured to detect an output voltage of the vehicle alternator; and
    a hunting suppression control unit configured to judge one of whether or not the rotation speed is within an idling rotation speed range and whether or not a periodic change of the rotation speed is not less than a predetermined value, and configured to perform an output voltage decreasing control for decreasing the output voltage of the vehicle alternator by a predetermined voltage value in order to suppress a hunting phenomenon of the vehicle alternator when the judgment result indicates that the rotation speed is within the idling rotation speed range or the periodic change of the rotation speed is not less than the predetermined value, wherein
    when the judgment result indicates that the rotation speed is within the idling rotation speed range or the periodic change of the rotation speed is not less than the predetermined value, the hunting suppression control unit performs the output voltage decreasing control so that the output voltage of the vehicle alternator is equal to a target adjustment voltage which is larger than an opening voltage of the storage battery and lower than a reference output voltage which is determined in advance corresponding to a storage battery temperature.

2. The electric power generation control apparatus according to claim 1, wherein the hunting suppression control unit performs the output voltage decreasing control for decreasing the output voltage of the vehicle alternator by the predetermined voltage value when the judgment result indicates that the rotation speed is within the idling rotation speed range and the periodic change of the rotation speed is not less than the predetermined value.

3. An electric power generation control apparatus for a vehicle alternator, comprising:
    an exciting current control unit configured to control an exciting current, which flows in an exciting coil of a vehicle alternator which is driven by an internal combustion engine, generates an electric power, and supplies the electric power to a storage battery;
    an exciting current detection unit configured to detect the exciting current;
    a rotation speed detection unit configured to detect a rotation speed of the engine or the vehicle alternator;
    an output voltage detection unit configured to detect an output voltage of the vehicle alternator; and
    a hunting suppression control unit configured to judge one of whether or not the rotation speed is within an idling rotation speed range and whether or not a periodic change of the rotation speed is not less than a predetermined value, and configured to perform an output voltage decreasing control for decreasing the output voltage of the vehicle alternator by a predetermined voltage value in order to suppress a hunting phenomenon of the vehicle alternator when the judgment result indicates that the rotation speed is within the idling rotation speed range or the periodic change of the rotation speed is not less than the predetermined value, wherein when the judgment result indicates that the rotation speed is within the idling rotation speed range or the periodic change of the rotation speed is not less than the predetermined value, the hunting suppression control unit performs the output decreasing control so that the output voltage of the vehicle alternator is equal to an target adjustment voltage which is approximately equal to an opening voltage of the storage battery.

4. The electric power generation control apparatus according to claim 3, wherein the hunting suppression control unit performs the output voltage decreasing control for decreasing the output voltage of the vehicle alternator by the predetermined voltage value when the judgment result indicates that the rotation speed is within the idling rotation speed range and the periodic change of the rotation speed is not less than the predetermined value.

5. An electric power generation control apparatus comprising:
an exciting current control unit configured to control an exciting current flowing in an exciting coil of a vehicle alternator which is driven by an engine and generates an electric power and supplies the electric power to a storage battery;
an exciting current detection unit configured to detect the exciting current;
a rotation speed detection unit configured to detect a rotation speed of the engine or the vehicle alternator;
an output voltage detection unit configured to detect an output voltage of the vehicle alternator; and
a hunting suppression control unit configured to judges one of whether or not the rotation speed is within an idling rotation speed range and whether or not a periodic change of the rotation speed is not less than a predetermined value, and configured to perform a constant torque control for keeping a constant torque of the vehicle alternator in order to suppress a hunting phenomenon of the vehicle alternator when the judgment result indicates that the rotation speed is within the idling rotation speed range or the periodic change of the rotation speed is not less than the predetermined value, wherein
the hunting suppression control unit first performs an output voltage decreasing control for decreasing the output voltage of the vehicle alternator by a predetermined voltage value, and
when the hunting suppression control cannot suppress the hunting phenomenon of the vehicle alternator, the hunting suppression control unit performs one of the constant torque control for keeping a constant torque of the vehicle alternator and a constant exciting current control for keeping a constant exciting current.

6. The electric power generation control apparatus according to claim 5, wherein the hunting suppression control unit performs the constant torque control for keeping a constant torque of the vehicle alternator when the judgment result indicates that the rotation speed is within the idling rotation speed range and the periodic change of the rotation speed is not less than the predetermined value.

7. An electric power generation control apparatus comprising:
an exciting current control unit configured to control an exciting current flowing in an exciting coil of a vehicle alternator which is driven by an engine and generates an electric power and supplies the electric power to a storage battery;
an exciting current detection unit configured to detect the exciting current;
a rotation speed detection unit configured to detect a rotation speed of the engine or the vehicle alternator;
an output voltage detection unit configured to detect an output voltage of the vehicle alternator; and
a hunting suppression control unit configured to judges one of whether or not the rotation speed is within an idling rotation speed range and whether or not a periodic change of the rotation speed is not less than a predetermined value, and configured to perform a constant exciting current control for keeping a constant exciting current in order to suppress a hunting phenomenon of the vehicle alternator when the judgment result indicates that the rotation speed is within the idling rotation speed range or the periodic change of the rotation speed is not less than the predetermined value, wherein
the hunting suppression control unit first performs an output voltage decreasing control for decreasing the output voltage of the vehicle alternator by a predetermined voltage value, and
when the hunting suppression control cannot suppress the hunting phenomenon of the vehicle alternator, the hunting suppression control unit performs one of a constant torque control for keeping a torque of the vehicle alternator constant and the constant exciting current control for keeping a constant exciting current.

8. The electric power generation control apparatus according to claim 7, wherein the hunting suppression control unit performs the constant exciting current control for keeping a constant exciting current when the judgment result indicates that the rotation speed is within the idling rotation speed range and the periodic change of the rotation speed is not less than the predetermined value.

9. An electric power generation control apparatus for a vehicle alternator, comprising:
an exciting current control unit configured to control an exciting current, which flows in an exciting coil of a vehicle alternator which is driven by an internal combustion engine, generates an electric power, and supplies the electric power to a storage battery;
an exciting current detection unit configured to detect the exciting current;
a rotation speed detection unit configured to detect a rotation speed of the engine or the vehicle alternator;
an output voltage detection unit configured to detect an output voltage of the vehicle alternator; and
a hunting suppression control unit configured to judge one of whether or not the rotation speed is within an idling rotation speed range and whether or not a periodic change of the rotation speed is not less than a predetermined value, and configured to perform an output voltage decreasing control for decreasing the output voltage of the vehicle alternator by a predetermined voltage value in order to suppress a hunting phenomenon of the vehicle alternator when the judgment result indicates that the rotation speed is within the idling rotation speed range or the periodic change of the rotation speed is not less than the predetermined value, wherein the hunting suppression control unit firstly performs the output voltage decreasing control, and when the hunting suppression control cannot suppress the hunting phenomenon of the vehicle alternator, the hunting suppression control unit performs one of a constant torque control for keeping a constant torque of the vehicle alternator and a constant exciting current control for keeping a constant exciting current.

10. The electric power generation control apparatus according to claim 9, wherein the hunting suppression control unit performs the output voltage decreasing control for decreasing the output voltage of the vehicle alternator by the predetermined voltage value when the judgment result indicates that the rotation speed is within the idling rotation speed range and the periodic change of the rotation speed is not less than the predetermined value.

* * * * *

UNITED STATES PATENT AND TRADEMARK OFFICE
CERTIFICATE OF CORRECTION

| | | |
|---|---|---|
| PATENT NO. | : 7,902,798 B2 | Page 1 of 1 |
| APPLICATION NO. | : 12/073255 | |
| DATED | : March 8, 2011 | |
| INVENTOR(S) | : Norihito Kimura et al. | |

It is certified that error appears in the above-identified patent and that said Letters Patent is hereby corrected as shown below:

Please amend the title page as follows:

Item (75), please change "Hikinan" to "Hekinan."

Signed and Sealed this
Thirty-first Day of May, 2011

David J. Kappos
*Director of the United States Patent and Trademark Office*